(12) United States Patent
Bilton et al.

(10) Patent No.: US 10,427,859 B2
(45) Date of Patent: Oct. 1, 2019

(54) DISPENSER FOR A CREAM, GEL OR SOFT SOLID COMPOSITION

(71) Applicant: Conopco, Inc., Englewood Cliffs, NJ (US)

(72) Inventors: Simon Lewis Bilton, Leamington Spa (GB); Christopher John Jones, Tewkesbury (GB); Rebecca Anne Nelson, Bristol (GB); Benjamin George Oglesby, Leeds (GB); Guy Richard Thompson, Parkgate (GB); Iain Andrew Weddell, Chester (GB)

(73) Assignee: Conopco, Inc., Englewood Cliffs, NJ (US)

( * ) Notice: Subject to any disclaimer, the term of this patent is extended or adjusted under 35 U.S.C. 154(b) by 129 days.

(21) Appl. No.: 15/517,361

(22) PCT Filed: Oct. 13, 2015

(86) PCT No.: PCT/EP2015/073699
§ 371 (c)(1),
(2) Date: Apr. 6, 2017

(87) PCT Pub. No.: WO2016/062584
PCT Pub. Date: Apr. 28, 2016

(65) Prior Publication Data
US 2017/0247170 A1 Aug. 31, 2017

(30) Foreign Application Priority Data
Oct. 24, 2014 (EP) .................................... 14190349

(51) Int. Cl.
*B65D 83/00* (2006.01)
*A45D 34/04* (2006.01)
(Continued)

(52) U.S. Cl.
CPC ......... *B65D 83/0038* (2013.01); *A45D 34/04* (2013.01); *B05C 17/012* (2013.01);
(Continued)

(58) Field of Classification Search
CPC ............ B65D 83/0038; B65D 83/0033; B65D 83/0011; B65D 83/002; A45D 34/04;
(Continued)

(56) References Cited

U.S. PATENT DOCUMENTS

| 5,255,990 A | 10/1993 | Dornbusch et al. |
| 5,336,005 A | 8/1994 | Moeck et al. |

(Continued)

FOREIGN PATENT DOCUMENTS

| EP | 0108636 | 5/1984 |
| EP | 0312165 | 4/1989 |

(Continued)

OTHER PUBLICATIONS

IPRP1 in PCTEP2015073706; Apr. 25, 2017.
(Continued)

*Primary Examiner* — David J Walczak
(74) *Attorney, Agent, or Firm* — Greenebrg Traurig, LLP

(57) ABSTRACT

A dispenser (1) suitable for delivery of a cream, gel or soft solid composition comprising: (vi) a convex applicator surface (6) at an upper end; (vii) a replaceable cartridge (12) containing a composition to be dispensed; (viii) a passageway between the cartridge and the applicator surface; (ix) a drive mechanism for forcing the composition from the cartridge through the passageway and onto the applicator surface; and (x) an outer body (3) containing features (ii) to (iv); the drive mechanism comprising a dial unit (4) and a plunger (47), rotation of the dial unit (4) in a first direction advancing the plunger (47) axially upwards, the plunger (47) acting upon a piston seal (8) at the base of the replaceable
(Continued)

cartridge (12), thereby forcing the contained composition upwards and outwards through the passageway and onto the applicator surface (6); rotation of the dial unit (4) in a second direction, counter to the first, rotationally re-setting the dial unit (4) relative to the plunger (47) in readiness for a further advancement of the plunger (47), rotation in the second direction not causing significant axial movement of the plunger (47).

11 Claims, 15 Drawing Sheets

(51) Int. Cl.
  *B05C 17/01* (2006.01)
  *G01F 11/02* (2006.01)
  *B05C 17/005* (2006.01)
(52) U.S. Cl.
  CPC ...... *G01F 11/021* (2013.01); *B05C 17/00576* (2013.01); *B05C 17/0133* (2013.01)
(58) Field of Classification Search
  CPC ....... A45D 34/00; G01F 11/021; G01F 11/00; G01F 11/025; B05C 17/012; B05C 17/0133; B05C 17/00576; B05C 17/0116
  See application file for complete search history.

(56) References Cited

U.S. PATENT DOCUMENTS

| | | | | |
|---|---|---|---|---|
| 5,851,079 | A * | 12/1998 | Horstman | A45D 34/042 401/174 |
| 6,071,027 | A | 6/2000 | Gueret | |
| 6,474,891 | B1 * | 11/2002 | Liu | B43K 8/04 401/172 |
| 7,213,994 | B2 * | 5/2007 | Phipps | A61M 35/003 222/390 |
| 7,237,975 | B2 * | 7/2007 | Noguchi | A45D 34/042 401/171 |
| 8,618,160 | B2 | 12/2013 | Johnston et al. | |
| 2008/0207737 | A1 | 8/2008 | Zinger | |
| 2010/0114025 | A1 | 5/2010 | Moller | |
| 2010/0217176 | A1 | 8/2010 | Carrara et al. | |
| 2014/0154197 | A1 | 6/2014 | Swaile et al. | |

FOREIGN PATENT DOCUMENTS

| | | |
|---|---|---|
| EP | 2243720 | 10/2010 |
| GB | 2472412 | 2/2011 |
| WO | WO0211690 | 2/2002 |
| WO | WO0211690 A1 | 2/2002 |
| WO | WO2010081205 | 7/2010 |
| WO | WO2011039236 | 4/2011 |
| WO | WO2012131320 | 10/2012 |

OTHER PUBLICATIONS

IPRP2 in PCTEP2015073699, Jan. 4, 2017.
Search Report in EP14190348, dated Apr. 21, 2015.
Search Report in EP14190349, dated Mar. 31, 2015.
Search Report in EP14190350, dated Apr. 21, 2015.
Search Report in PCTEP2015073699, dated Dec. 23, 2015.
Search Report in PCTEP2015073706, dated Nov. 3, 2015.
Written Opinion in EP14190348, dated Apr. 21, 2015.
Written Opinion in EP14190349, dated Mar. 31, 2015.
Written Opinion in EP14190350, dated Apr. 21, 2015.
Written Opinion in PCTEP2015073699, dated Dec. 23, 2015.
Written Opinion in PCTEP2015073706, dated Nov. 3, 2015.
Co-Pending Application, Simon Lewis Bilton, U.S. Appl. No. 15/517,340, filed Apr. 6, 2017.

* cited by examiner

DISPENSER FOR A CREAM, GEL OR SOFT SOLID COMPOSITION

The present invention is in the field of dispensers/applicators, in particular dispensers/applicators for creams, gels or soft solid compositions and especially dispensers/applicators for cosmetic and pharmaceutical compositions.

Dispensers and applicators for creams and soft solids come in many guises. Many such devices have been disclosed for the dispensing and applying cosmetic compositions.

EP 2,243,720 A1 (Nossbaum et al, 2010) discloses an apparatus for dispensing viscous substances having a drive mechanism comprising a drive nut and an expulsion member comprising a plunger. The apparatus is suitable for use with toothpaste or soap.

U.S. Pat. No. 5,336,005 (Schwan Stabilo Schwanhaeusser, 1994) discloses an applicator device for a spreadable stick material axially displaced by a screwthreaded spindle. The screwthreaded spindle is returned to its start position by a spring when the front end of the applicator is removed.

U.S. Pat. No. 6,071,027 (L'Oreal, 2000) discloses an applicator holder device comprising a pusher mechanism that can be actuated so as to pass from a rest position to an active position. The pusher mechanism drives an applicator in an axial duct and can be returned to its rest position when the head is removed from the holder.

Other dispensers and applicators have been disclosed for the dispensing and applying pharmaceutical compositions.

WO 12/131320 A2 (Leo Pharma AS, 2013) discloses an applicator for a semi-solid medicament comprising an applicator head, a cartridge, and a drive mechanism comprising a rotatable dial knob and a piston.

US 2010/0114025 (Novo Nordisk, 2010) discloses an injection device for injection of a drug, the device comprising dose setting mechanism, a piston rod adapted to cooperate with a piston placed in a cartridge containing the drug to be delivered as a set dose.

WO 2011/039236 A1 (Sanofi-Aventis, 2011) discloses a resettable drive assembly for a drug delivery device comprising a drive unit for driving a piston rod; the drive unit comprising members allowed and prevented from undergoing relative rotational movement as desired.

According to a first aspect of the invention, there is provided a dispenser for delivery of a cream, gel or soft solid composition, comprising:
(i) a convex applicator surface at an upper end;
(ii) a replaceable cartridge containing a composition to be dispensed;
(iii) a passageway between the cartridge and the applicator surface;
(iv) a drive mechanism for forcing the composition from the cartridge through the passageway and onto the applicator surface; and
(v) an outer body containing features (ii) to (iv);
the drive mechanism comprising a dial unit and a plunger, rotation of the dial unit in a first direction advancing the plunger axially upwards, the plunger acting upon a piston seal at the base of the replaceable cartridge, thereby forcing the contained composition upwards and outwards through the passageway and onto the applicator surface; rotation of the dial unit in a second direction, counter to the first, rotationally re-setting the dial unit relative to the plunger in readiness for a further advancement of the plunger, rotation in the second direction not causing significant axial movement of the plunger.

According to a second aspect of the invention, there is provided a method of applying a composition to the surface of the human body comprising the use of a dispenser according to the first aspect of the invention.

According to a third aspect of the invention, there is provided a method of assembly of a dispenser according to the first aspect of the invention.

The present invention provides an easy to use dispenser and method for applying a cream, gel or soft solid composition to the surface of the human body. Further, the dispenser and method allows the user to topically apply the composition without touching it with his or her fingers.

The reciprocating movement of the dial unit, first in one rotational direction and then in the opposite direction (to re-set), is ergonomically favourable and allows multiple doses to be delivered (if desired) without the user releasing his or her grip on the dial unit.

The dispenser is designed to deliver accurate unit doses of composition to the surface of the human body, this being achieved both by the internal features of the dispenser and by the applicator surface, which allows effective and near quantitative transfer of the composition to its site of application.

The dispenser is designed to be easily re-loaded when the replaceable cartridge has been emptied. Further, this process can be achieved without the user touching the composition with his or her hands. The replacement mechanism allows the drive mechanism for the dispenser to be decoupled without harming it and for it to be re-coupled and re-used following insertion of a replacement cartridge.

Herein, application to the surface of the human body is preferably done directly. It is particularly preferred that application does not involve contact of the composition to be applied with the fingers of the person performing the application.

Herein, dispensers according to the invention may be equally consider to be "applicators", since their intended function is both dispensing and application of the composition contained within.

Herein "application" should be considered to refer to application to the surface of the human body, unless otherwise indicated.

Dispensers of the present invention are particularly suitable for applying compositions to the surface of the human body and especially suitable for applying compositions to the underarm regions of the human body. One of the features of the invention relevant to the latter area of application is the concave applicator surface.

Dispensers of the present invention are suitable for applying cosmetic compositions and/or pharmaceutical compositions to the surface of the human body. With their particular suitability for the application of compositions to the underarm regions, they are particularly suitable for the application of antiperspirant compositions.

Whether cosmetic and/or pharmaceutical in nature, the composition applied using the present invention is most advantageously a cream, gel, or soft solid. This is particularly the case when application is to the underarm regions and especially the case when the composition is an antiperspirant composition.

Herein, an "antiperspirant composition" should be considered to be any composition that leads to a reduction in perspiration, by whatever mechanism, and shall include both cosmetic and/or pharmaceutical treatments for hyperhidrosis.

The creams, gels, and soft solids most advantageous for use in accordance with the present invention may be defined by their viscosity. They are preferably of viscosity from 3500 mPa·s to 5000 mPa·s at a shear rate of 16/s and more preferably of viscosity from 4000 mPa·s to 4600 mPa·s at a shear rate of 16/s. The shear rate of 16/s equates to that to which the composition is typically subjected to as it is extruded onto the convex applicator surface and is highly relevant to the flow properties of the composition at this time and immediately thereafter.

It is further preferred that the compositions most advantageous for use in accordance with the present invention have a viscosity of from 60 mPa·s to 80 mPa·s at a shear rate of 4240/s and more preferably of viscosity from 64 mPa·s to 74 mPa·s at a shear rate of 4240/s. The shear rate of 4240/s equates to that to which the composition is typically subjected to it is transferred from the convex applicator surface into the surface of the human body and is highly relevant to the flow properties of the composition at this time.

Herein, viscosities are as measured at 25° C. and 1 atmosphere pressure.

The convex applicator surface at the upper end of the dispenser is of particular value for the application of creams, gels, and soft solids to the underarm regions, especially for such compositions having one of the preferred viscosity ranges indicated in the paragraphs above. This is true because such compositions spread well on the applicator surface, but are retained thereby, enabling their effective massage into the skin of the underarms.

In preferred embodiments, the convex applicator surface is smooth, i.e. it does not have indentations or protrusions such as ridges or lumps.

Herein, the convex applicator surface may be alternatively termed "dome-shaped".

Herein, "dome-shaped" refers to three-dimensional convex surfaces and is not restricted to dome surfaces that have the shape of the outer surface of part of a sphere.

Herein, orientation terms such as "top" and "bottom", "upwards" and "downwards", "upper" and "lower", "vertical" and "horizontal", should be understood to relate to the dispenser and/or its components when the dispenser is upright on a horizontal surface with the applicator head upmost, unless otherwise indicated. The "front" of the dispenser (1) should be understood to relate the (curved) face bearing the dose counter (22) described hereinbelow. The term "base" should be understood to have the same meaning as the term "bottom", unless otherwise indicated.

The applicator surface is preferably covered by a removable over-cap. This is of benefit in reducing potential evaporative loss from the composition to be dispensed, which can in turn aid its viscosity stability and flow properties. These benefits are further enhanced when the over-cap has a dimple on its inner surface that presses against a dispensing aperture in the applicator surface when the over-cap is in place.

The composition to be applied is stored in a replaceable cartridge which sits within the outer body of the dispenser. The replaceable cartridge has a body, typically cylindrical in shape, and a piston seal at its base. The internal volume of the replaceable cartridge will vary according to the intended use of the composition, but when the composition is as an antiperspirant composition, the internal volume is preferably from 1 to 50 ml, more preferably from 2 to 15 ml and most preferably from 2 to 10 ml.

The passageway between the cartridge and the applicator surface is critical to the successful functioning of the invention. In order to be of optimum value in delivering cream, gel and soft solid compositions, particularly those within each of the preferred viscosity ranges indicated above, the minimum cross-sectional area of the passageway is preferably at least 1.0 mm$^2$, more preferably at least 1.5 mm$^2$, and most preferably at least 3.0 mm$^2$.

Herein, the "minimum cross-sectional area of the passageway" is the minimum cross-sectional area of the passageway along its entire length, from the cartridge to the applicator surface. This dimension may alternatively be considered to be the minimum aperture area of the passageway.

The minimum aperture areas discussed above are of relevance because of their effect upon the delivery of the composition. Compositions intended for application by dispensers of the present invention have a viscosity that makes it difficult for them to pass through narrow orifices. For this reason, the passageway between the cartridge and the applicator surface must not be too narrow. It should be clear that at higher composition viscosities, particularly when the viscosity is from 3500 mPa·s to 5000 mPa·s at a shear rate of 16/s or when the viscosity is from 4000 mPa·s to 4600 mPa·s at a shear rate of 16/s, the more important it is to have a passageway of minimum cross-sectional area of preferably at least 1.0 mm$^2$, more preferably at least 1.5 mm$^2$, and most preferably at least 3.0 mm$^2$.

Possible problems encountered when the passageway is too narrow include high pressures within the cartridge and passageway, leading to possible leakage, slow dispensing of the composition onto the applicator surface and shear-thinning of composition as it passes through the passageway, leading to its poor retention on the applicator surface.

The drive mechanism for forcing the composition from the cartridge through the passageway and onto the applicator surface comprises a dial unit and a plunger. The dial unit typically sits at the base of the dispenser.

Rotation of the dial unit in a first direction causes the plunger to advance axially upwards. The plunger acts upon a piston seal at the base of the replaceable cartridge and when it is so advanced, it forces the piston seal upwards and the composition exits the cartridge and flows onto the applicator surface, via the passageway between the two.

Rotation of the dial unit in a second direction, counter to the first, rotationally re-sets the dial unit relative the plunger in readiness for a further advancement of the plunger. Importantly, rotation in the second direction does not cause significant axial movement of the plunger. Preferably, rotation of the dial unit in the second direction does not cause significant rotational movement of the plunger.

In preferred embodiments, the dispenser comprises a non-return ratchet, which interacts with the plunger to prevent significant axially movement of the plunger whilst the dial unit is rotated in the second direction as referred to in the above paragraph.

Herein, "significant axial movement of the plunger" should be understood to refer to movement by greater than 5% of length of the plunger.

Herein, "significant rotational movement" should be understood to mean rotation of 10° or more.

In preferred embodiments, rotation of the dial unit in the second direction does not cause rotational movement of the plunger by 5° or more. In particularly preferred embodiments, rotation of the dial unit in the second direction does not cause any rotational movement of the plunger.

It is advantageous to restrict rotational movement of the plunger during the rotation of the dial unit in the second direction since it simplifies the drive mechanism and makes it more robust.

In preferred embodiments, rotation of the dial unit in the second direction is brought about by a torsion spring that forces the dial unit back to its start position when torque applied to turn it in its first direction is released. This feature greatly enhances the ease of use of the dispenser.

In preferred embodiments, the first rotational direction of the dial unit is counter-clockwise and the second rotational direction is clockwise.

Herein, the terms "clockwise" and counter-clockwise" should be understood to relate to the dispenser and/or its components when viewed from above.

In preferred embodiments, rotation of the dial unit is restricted by stop faces, these faces abutting one another at the farthest rotation of the dial unit in its first direction and restricting rotational movement to preferably less than 180°, more preferably less than 120° and most preferably between to between 45° and 120°.

The stop faces, when employed, preferably function between the dial unit and the cylindrical body.

In preferred embodiments, an "advancing" ratchet which is rotationally locked to the dial unit interacts with "advancing" teeth on the plunger to cause the plunger to be raised axially upwards when the dial unit is rotated in its first direction.

The advancing ratchet interacts with the advancing teeth by contact of its upper surface with lower surfaces of the advancing teeth.

The advancing teeth on the plunger preferably protrude from its outer surface and slope helically downwards around the outer surface of the plunger in the first direction, this "first direction" being the same as that previously referred to with reference to the rotation of the dial unit. The teeth are stacked equidistantly one above the other, each sloping around the outer surface of the plunger.

In preferred embodiments, there is a second "non-return" ratchet rotationally locked to the dial unit which interacts with a second set of "non-return" teeth on the plunger to prevent significant downward movement of the plunger when the dial unit is rotated in its second direction.

When present, the non-return teeth on the plunger protrude from the outer surface thereof and each tooth is in a horizontal plane, the teeth being stacked equidistantly one above another in the set.

In embodiments comprising non-return teeth as described above, it is preferred that rotation of the dial unit in its second direction does not cause axial movement of the plunger that is greater than 50% of the axial distance between the non-return teeth.

To aid efficient functioning of the drive mechanism, it is preferred that the axial distance between the advancing teeth and the non-return teeth is approximately equal.

In preferred embodiments, the non-return teeth on the plunger sit on a section raised radially above a section bearing the advancing teeth.

In particularly robust embodiments, there are two raised sections bearing non-return teeth diagonally opposed and separated by two lower sections bearing advancing teeth, the teeth being as described in the preceding paragraphs. In such embodiments, there are also two diagonally opposed non-return ratchets designed to interact with the non-return teeth and two advancing ratchets designed to interact with the advancing teeth, each ratchet being as described in the preceding paragraphs and preferably having the optional/ preferred features also described.

In order to enhance the efficient functioning of the drive mechanism, it is preferred that the non-return ratchet(s) is/are capable of snapping over the next lower non-return tooth on the plunger when said non-return tooth is raised, together with the plunger, by the advancing ratchet(s).

In order to enhance the efficient functioning of the drive mechanism, it is preferred that the advancing ratchet(s) is/are capable of snapping over the next lower advancing tooth on the plunger when the dial unit is rotated in its second direction.

In preferred embodiments, the advancing ratchet(s) and non-return ratchet(s) are part of a ratchet sleeve, which is moulded independently of the dial unit, but slotted into the dial unit in a rotationally fixed manner during assembly of the dispenser. This arrangement eases manufacture of the dispenser.

The replaceable cartridge is preferably held in a holding unit or "refill holder" within the cylindrical body.

The cylindrical body preferably contains a dose counter, readings on which may be seen through a window in the cylindrical body. The dose counter is preferably axially fixed to the plunger, such that it rises and falls in together with the plunger.

In preferred embodiments, the plunger undergoes a rotational movement to allow disengagement from the drive mechanism and resetting of the plunger in readiness for the loading of a new replaceable cartridge. Such rotation is relative to the outer body and relative to the drive mechanism. In performing this rotational movement, the plunger drops back to its start position, preferably under the influence of a reset spring. When employed, the reset spring is typically a compression spring, preferably acting between the plunger and a holding unit for the replaceable cartridge.

The rotational movement of the plunger referred to above is preferably brought about by the rotation of an applicator head bearing the convex applicator surface. It is further preferred that this rotation allows for separation of the applicator head from the cylindrical body and the replacement of the cartridge contained within.

An applicator head that bears the convex applicator surface and that may be removed and replaced is a highly preferred feature of the dispensers according to the invention. The applicator head is preferably reversibly held onto the cylindrical body by means of one or more (preferably two) bayonet lugs on the applicator head slotting into corresponding bayonet tracks on the cylindrical body or vice versa.

In preferred embodiments, the removable applicator head as described in the paragraph immediately above comprises means for lifting the replaceable cartridge from the cylindrical body or from a refill holder within the cylindrical body. This enables the refill cartridge (12) to be removed from the refill holder (39) without the consumer needing to touch the potentially exposed composition at end of the refill cartridge (12). Typical means for lifting the replaceable cartridge are clips on a projection from the underside of the applicator head interacting with a retaining lip on the cartridge to give a light axial binding between the two.

Having a removable applicator head that comprises means for lifting the replaceable cartridge from the cylindrical body or from a refill holder within the cylindrical body is particularly beneficial when the cartridge contains a composition comprising an ingredient that it undesirable to get on the fingers of one's hand. This is particularly the case with ingredients that are non-pore blocking inhibitors of perspiration, because such ingredients are designed to permeate through the skin and could have undesirable effects, whether locally or systemically, if absorbed through the skin of the fingers.

When rotation of an applicator head brings about rotational movement of the plunger, this is preferably done by interaction of the applicator head with a holding unit for the replaceable cartridge, the holding unit being splined to the plunger to prevent rotational movement therebetween.

The interaction between the applicator head and the holding unit for the replaceable cartridge enabling the former to rotate the latter is preferably brought about by engagement tabs of the former fitting within engagement pockets of the latter, or vice versa.

Herein, references to rotation of the dial unit are relative to the outer body of the dispenser and also relative to the plunger during the first and second rotational movements referred to in the first aspect of the invention.

Herein, references to axial movement of the plunger are relative to the outer body of the dispenser and also to the body of the replaceable cartridge, when present within the dispenser.

The following description of the method assembly/manufacture applies in general terms to dispensers suitable for use in accordance with the present invention.

The method of manufacture of dispensers suitable for use in accordance with the present invention involves the bringing together of:
  (i) a convex applicator surface, to be located at an upper end;
  (ii) a replaceable cartridge having a piston seal at its base and containing a composition to be dispensed;
  (iii) a passageway between the cartridge and the applicator surface;
  (iv) a drive mechanism for forcing the composition from the cartridge through the passageway and onto the applicator surface, the drive mechanism comprising a dial unit and a plunger; and
  (v) an outer cylindrical body for containment of features (ii) to (iv).

It is preferred that the convex applicator surface is part of an applicator head that may be removed and replaced, the applicator head being added as a final stage of the method manufacture.

It is preferred that the drive mechanism assembly involves the bringing together of the dial unit and a ratchet sleeve responsible for driving the plunger axially upwards and for preventing its downward return, the ratchet sleeve being slotted into the dial unit in a rotationally fixed manner.

The method of manufacture preferably comprises the following steps:
  (i) a ratchet sleeve responsible for axial movement of the plunger is inserted into the cylindrical body and the dial unit is affixed to the base of the cylindrical body and to the base of the ratchet sleeve, such that the dial unit is rotational fixed relative to the ratchet sleeve;
  (ii) the plunger is inserted into the assembly formed in step (i);
  (iii) a holder for the replaceable cartridge is inserted into the assembly formed in step (ii); and
  (iv) an applicator head comprising the applicator surface is locked onto the assembly formed in step (iii), optionally after a replaceable cartridge is inserted into the holder therefor.

In the above method of manufacture, the plunger may be fitted with a dose counter prior to its insertion in step (ii). A compression spring for re-setting the plunger relative to the holder for the cartridge may also be added at this stage.

In the above method of manufacture, the applicator head is preferably locked onto the assembly formed in step (iii) by a rotation of bayonet lugs on the applicator head into bayonet tracks in the cylindrical body or vice versa.

Other preferred features of the method of manufacture/assembly are described following the description of the specific embodiment.

The invention shall now be described with reference to the following non-limiting embodiment. The Figures illustrate features of this specific embodiment, but it should be understood that each feature as described in detail herein is independently a preferred feature of the invention as defined in the claims.

Figure 6:
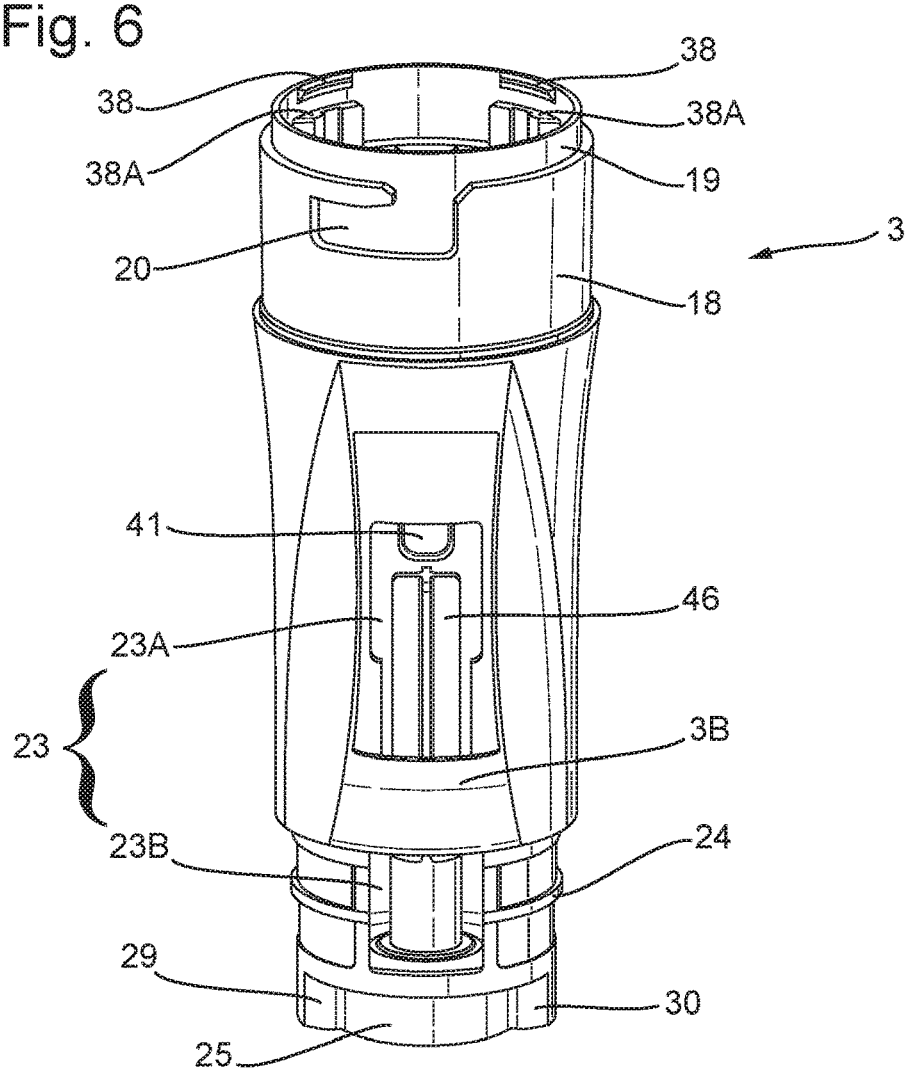
Figure 7:
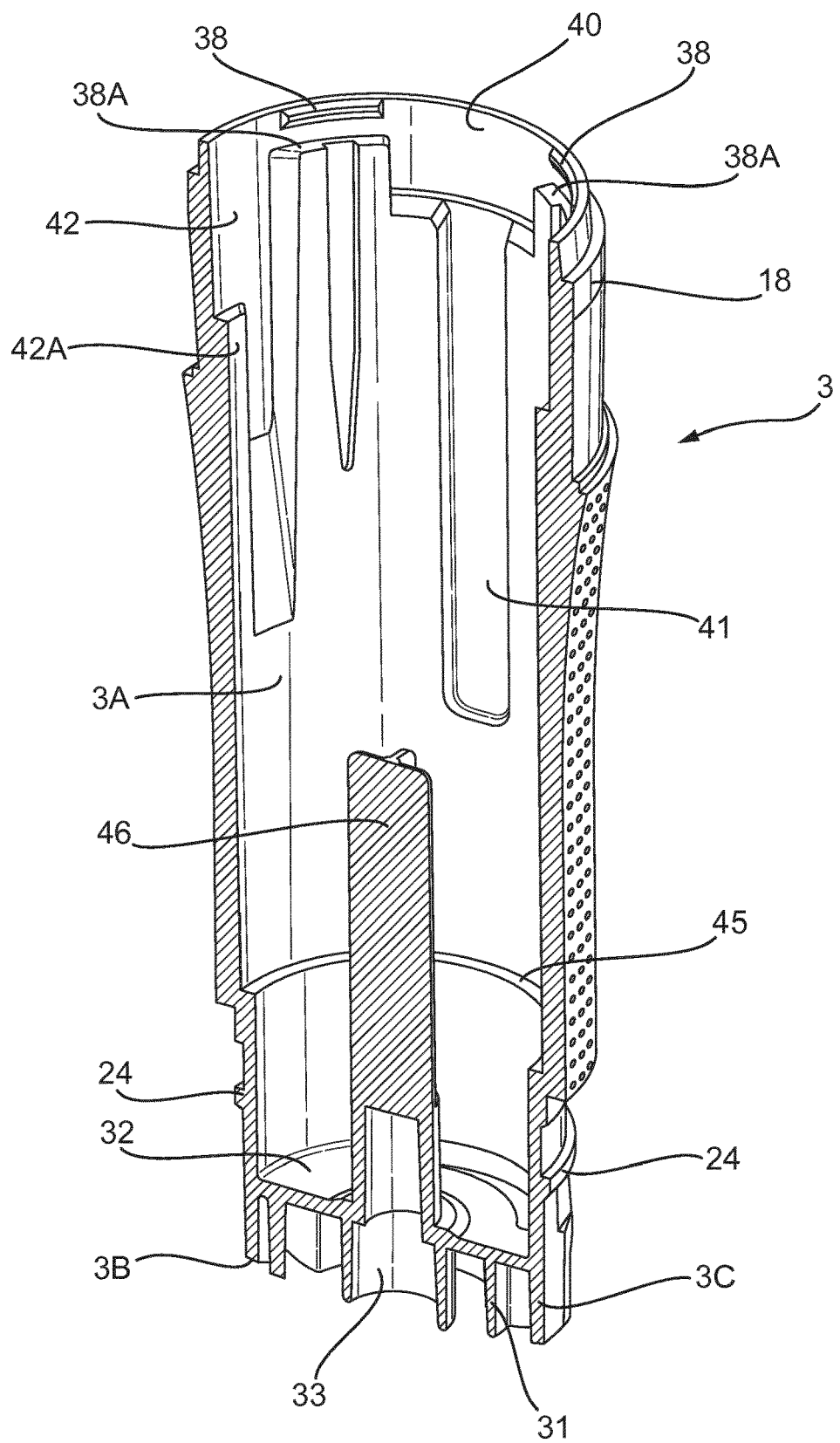
Figure 8:
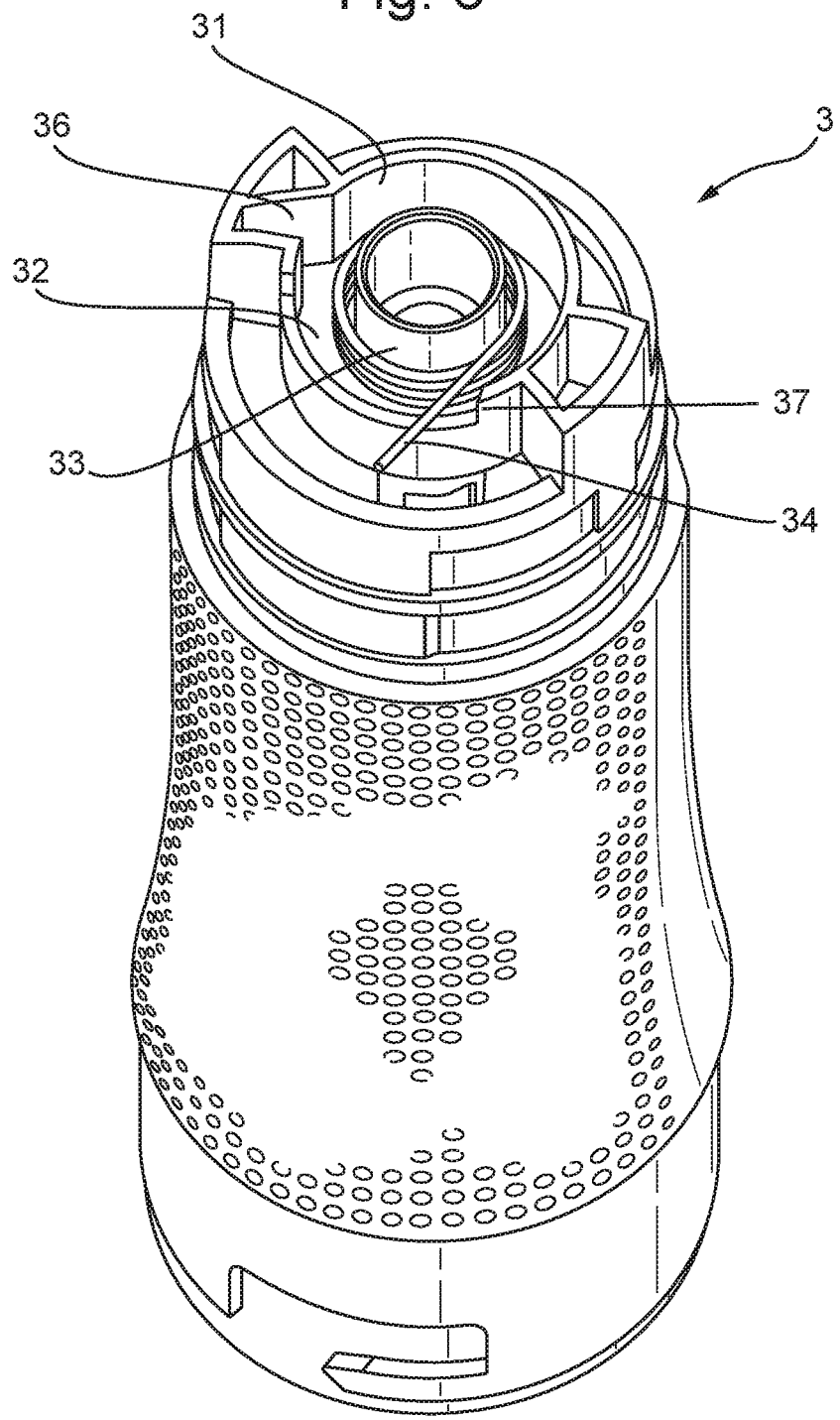

FIGS. 6, 7, and 8 illustrate the cylindrical body (3).

FIG. 6 is a slightly elevated view from the front;

FIG. 7 is a somewhat skewed lengthways cross-section and

FIG. 8 is a view from the side and bottom and also illustrates the dial spring (34).

Figure 9:
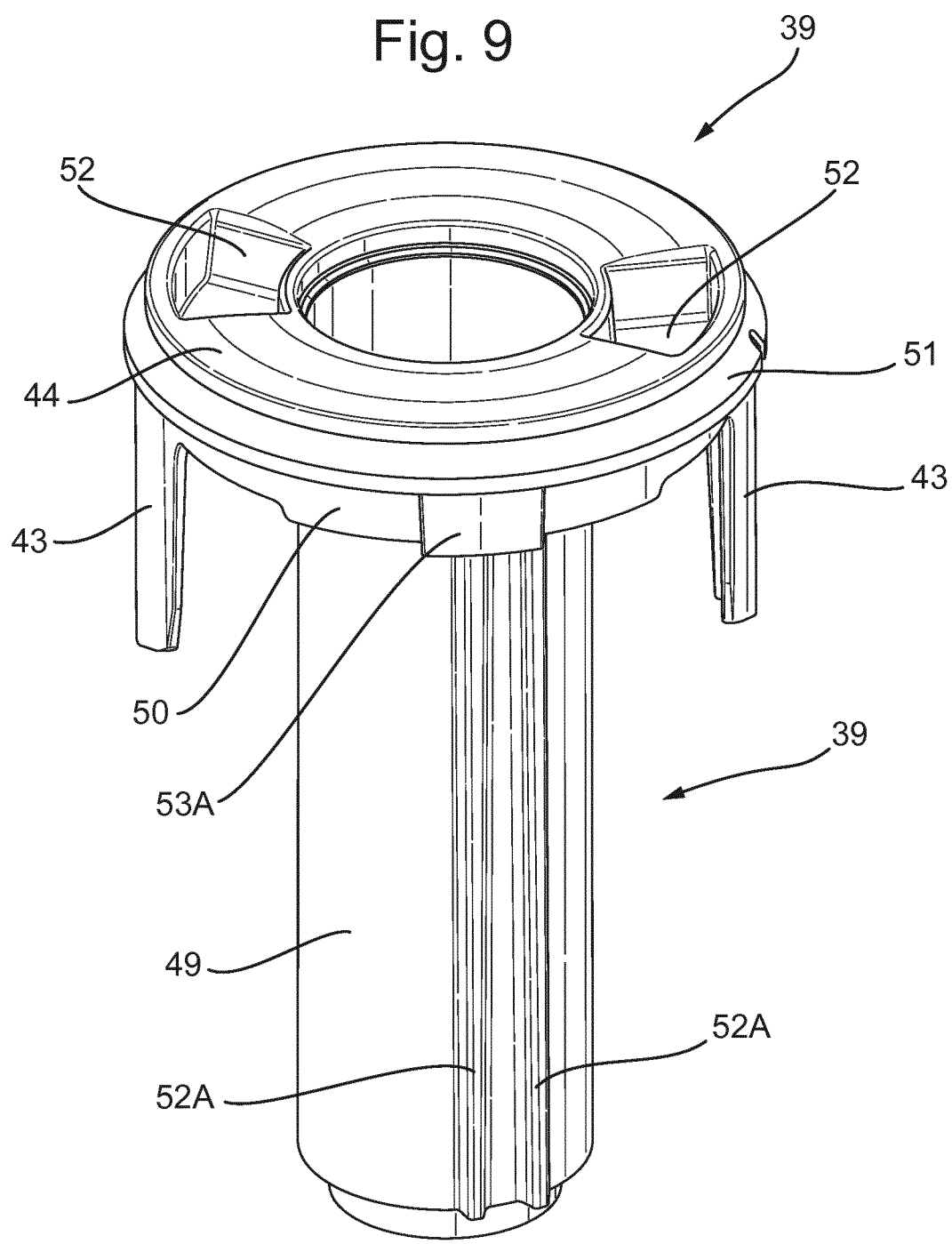
Figure 10:
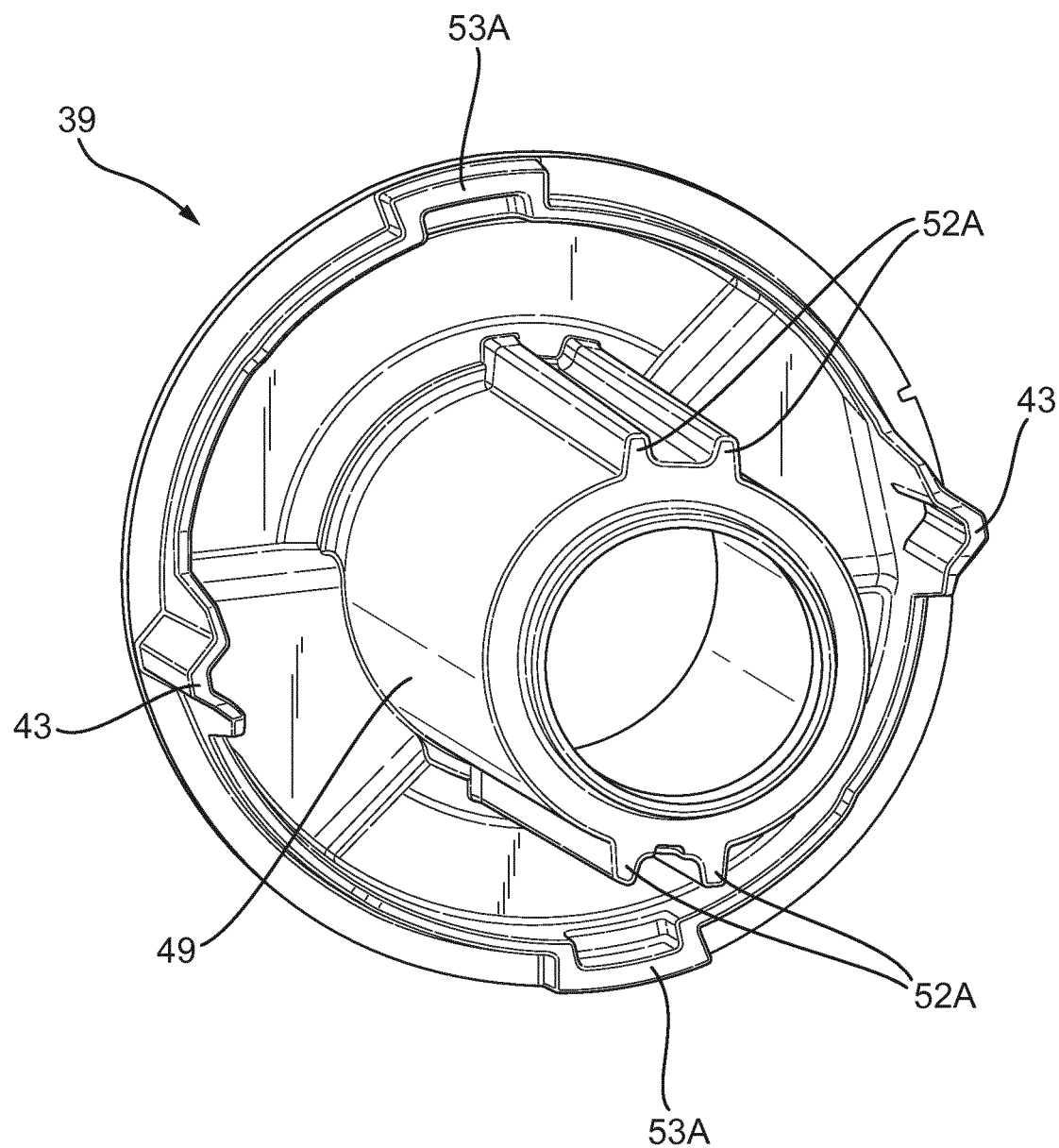
Figure 11:
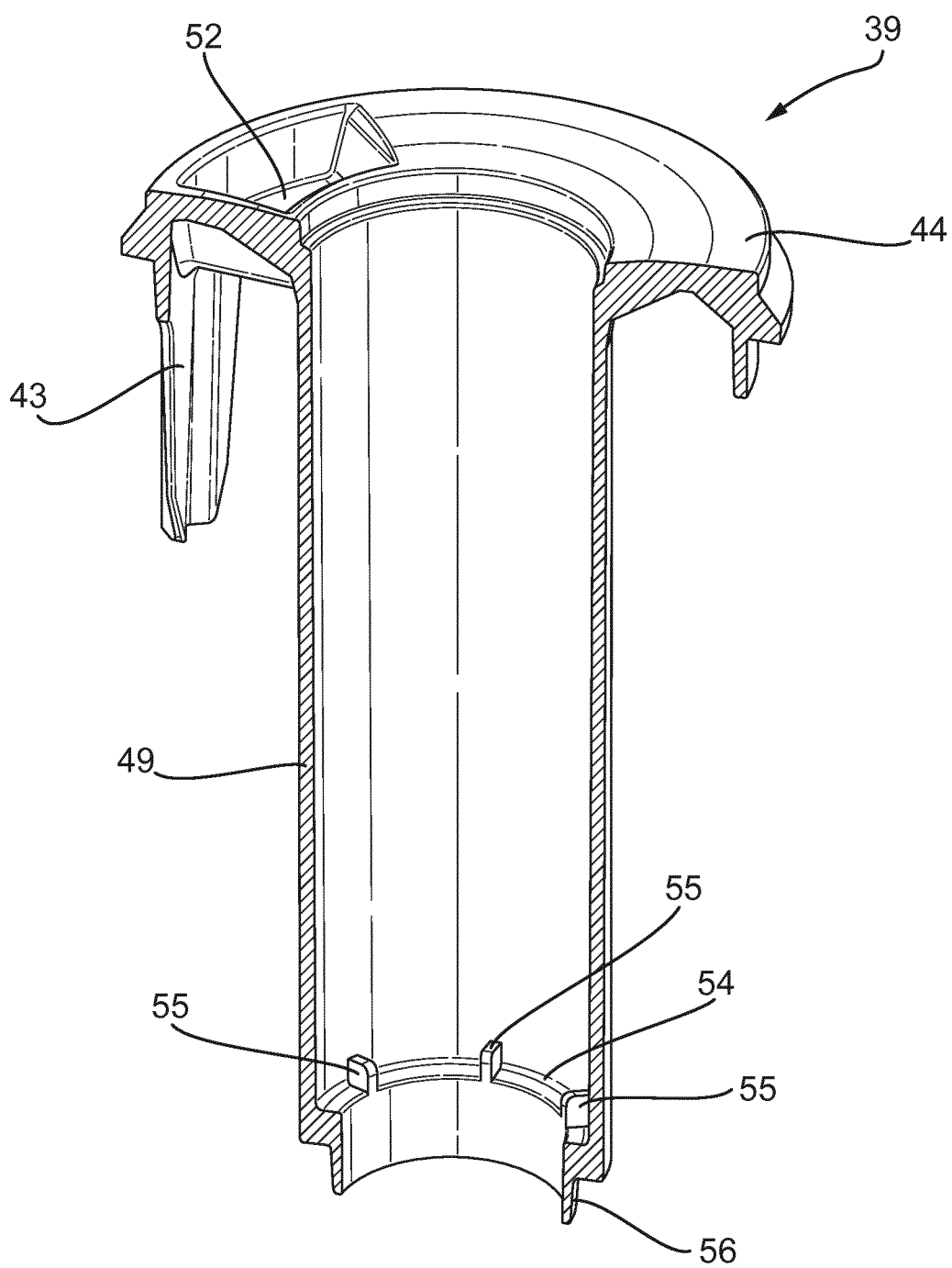

FIGS. 9, 10 and 11 are views of a refill holder (39) that is present within the cylindrical body (3).

FIG. 9 is a view from a side and above;

FIG. 10 is a view from below and

FIG. 11 is a somewhat skewed lengthways cross-sectional view.

Figure 12:
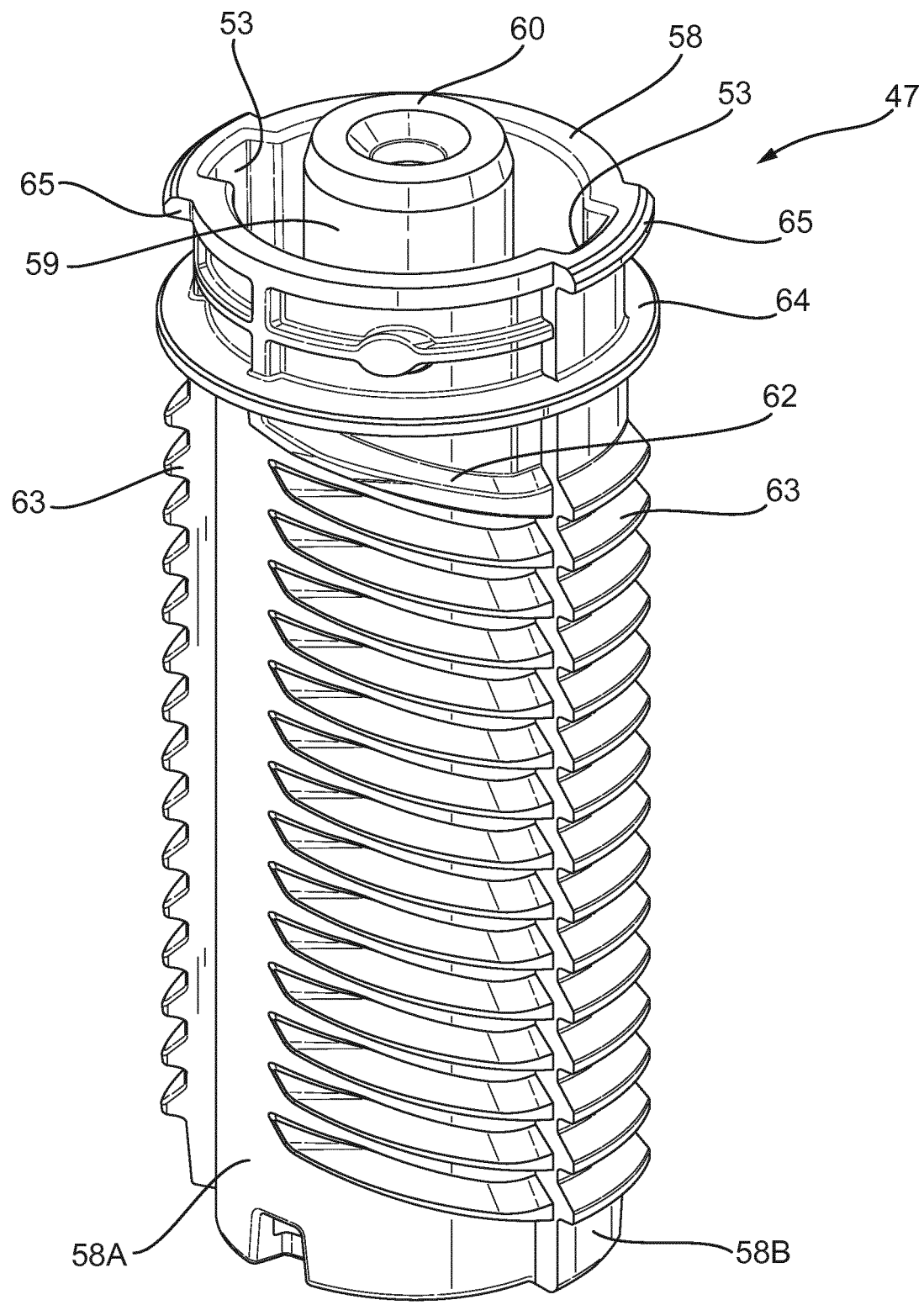
Figure 13:
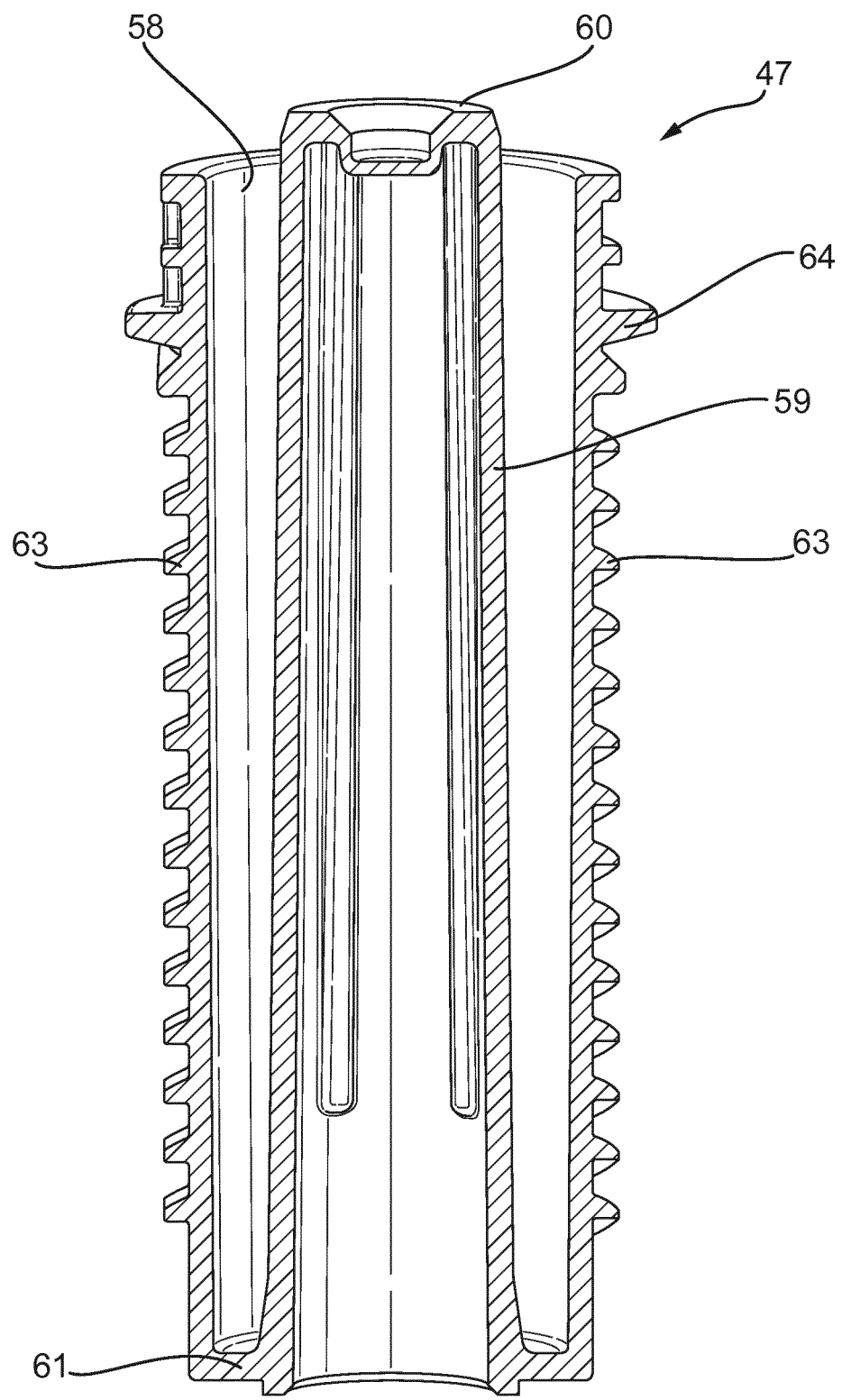

FIG. 12 is a view of a "plunger" (47) present within the cylindrical body (13) and FIG. 13 is a cross-sectional view of the same (from a different view point) and an associated reset spring (57).

Figure 14:
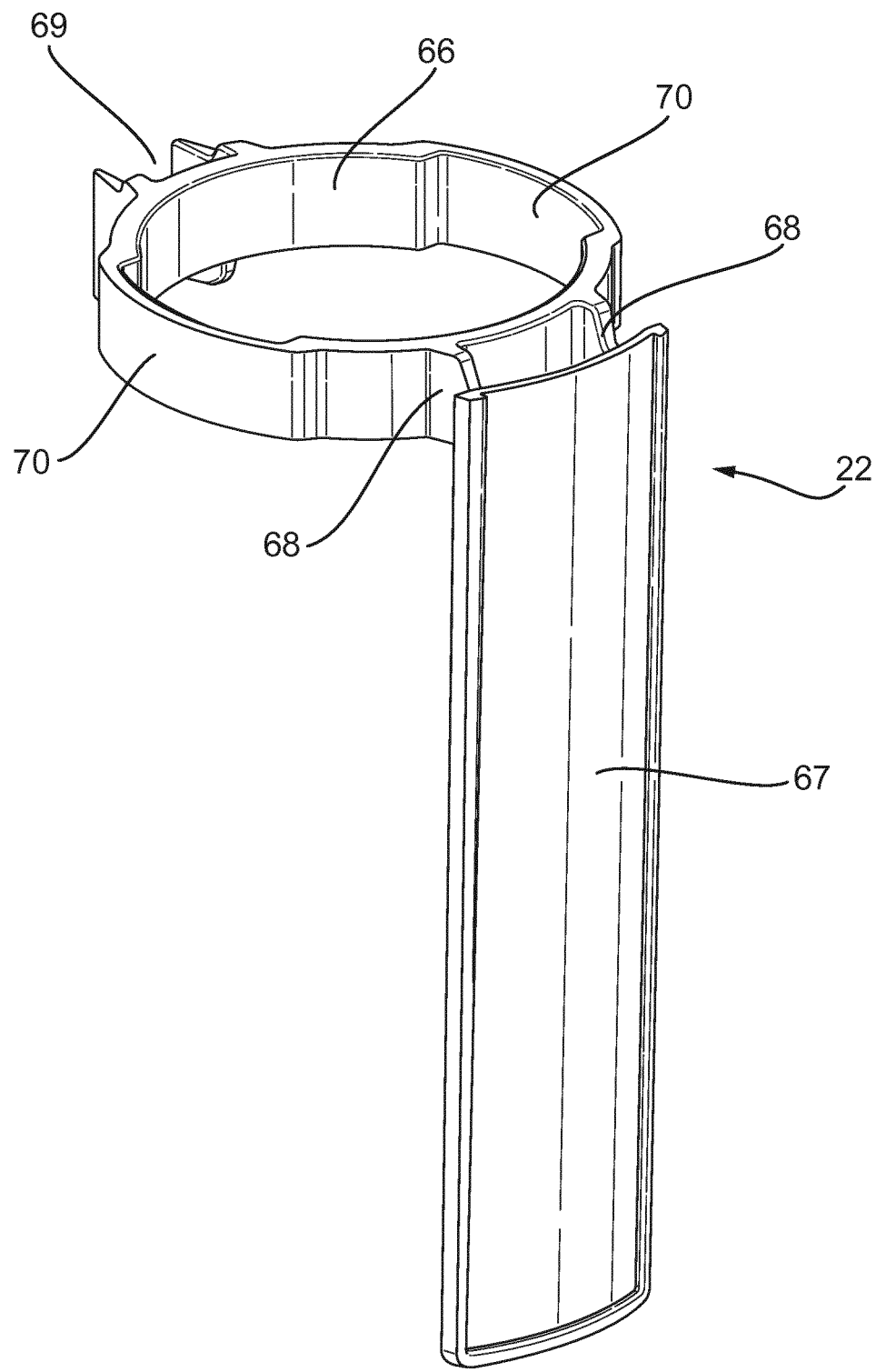

FIG. 14 is a view of a dose counter (22) used as part of the illustrated embodiment.

Figure 15:
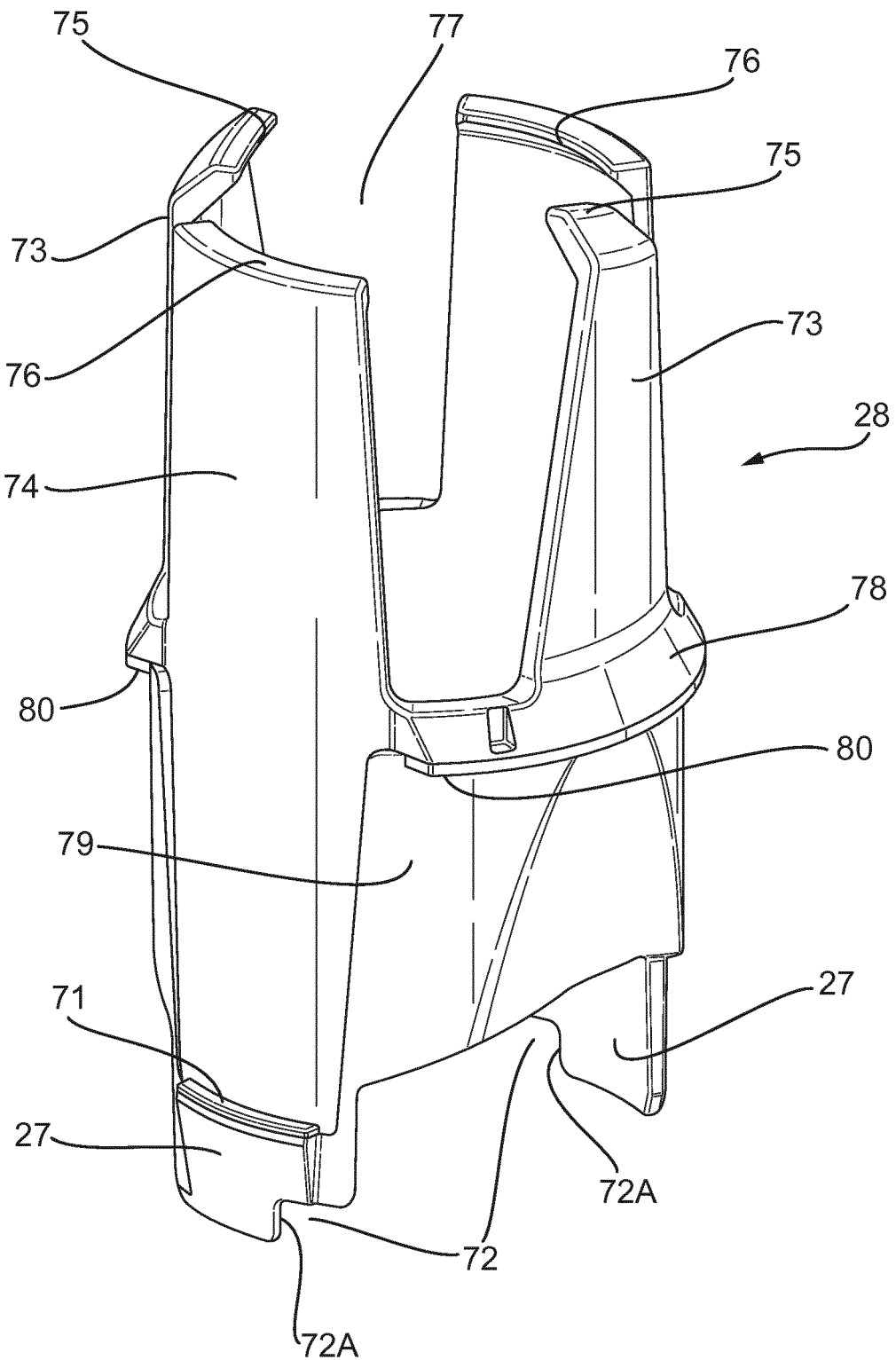

FIG. 15 is a view of a ratchet sleeve (28), used in conjunction with the plunger (47) and also held within the cylindrical body (13).

Figure 16:
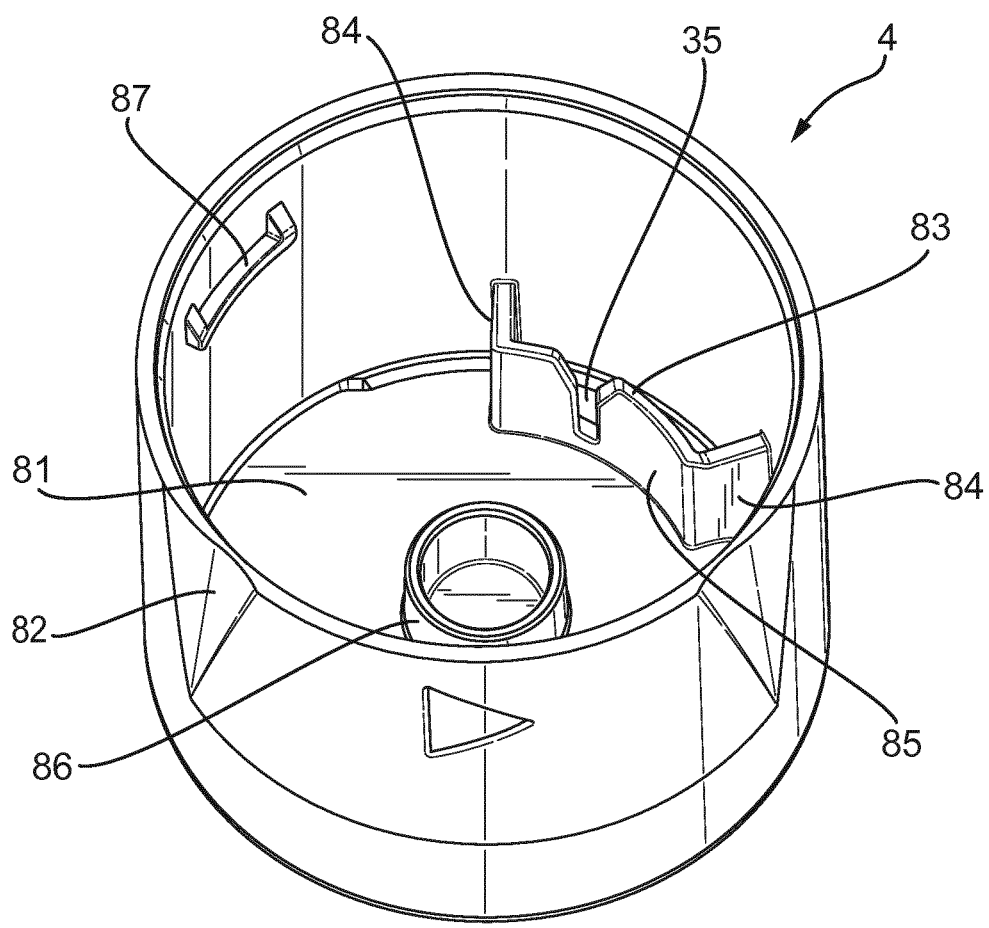

FIG. 16 is a view of dial unit (4) from the side and above.

Figure 17:
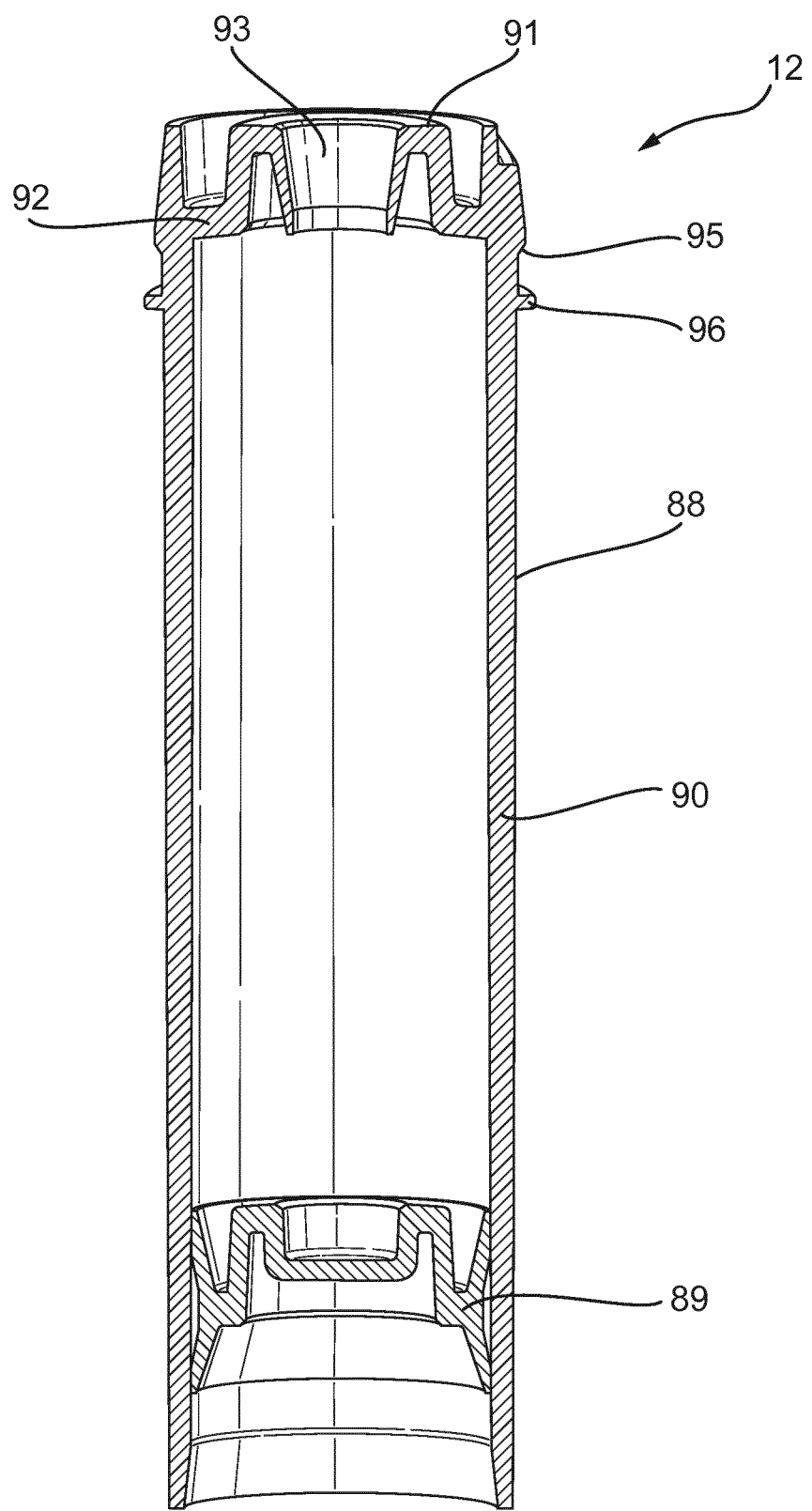

FIG. 17 is a cross-sectional view of a refill cartridge (12) used with the dispenser (1).

Figure 1:
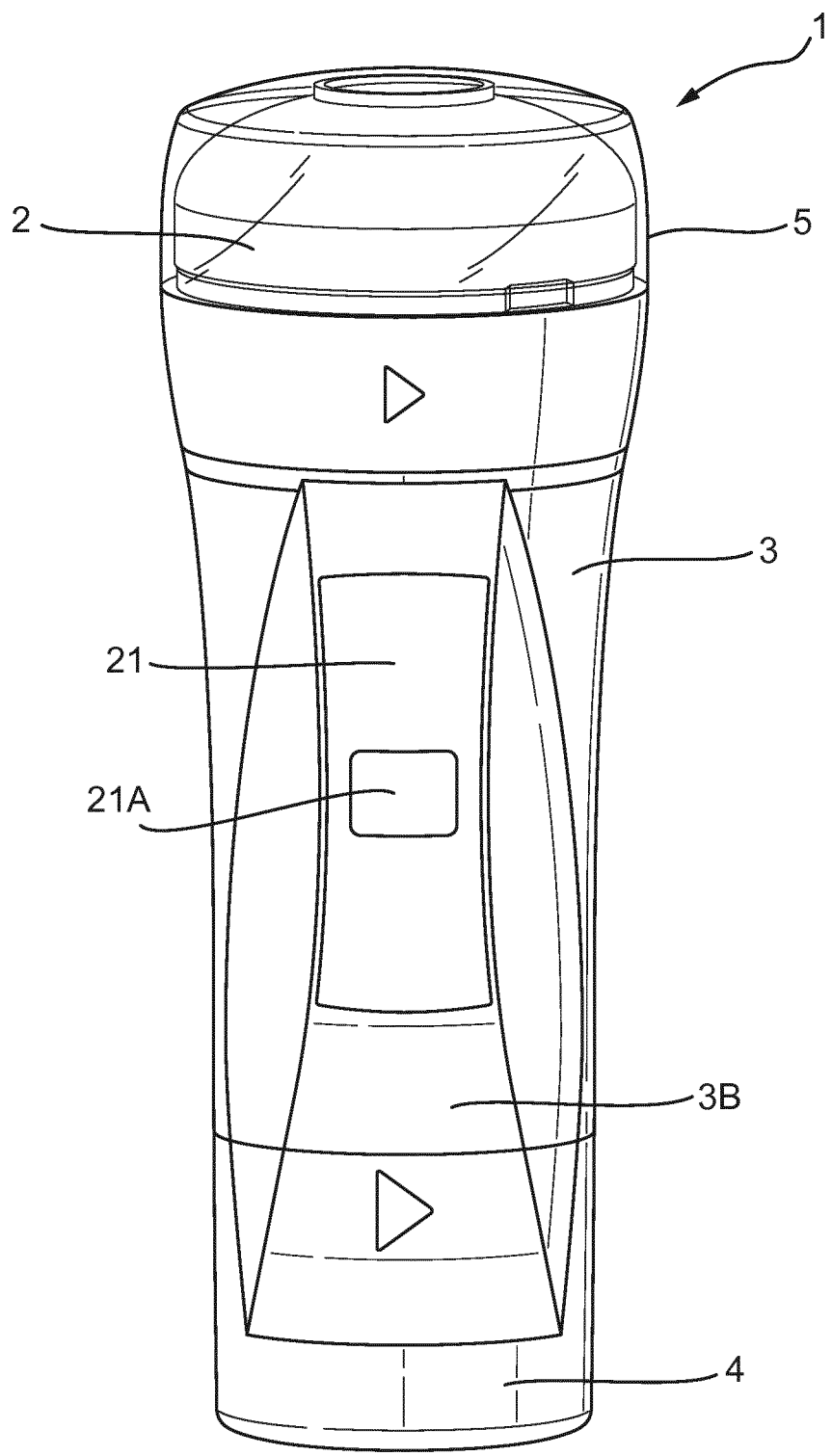
FIG. 1 is an exterior view from the front of the dispenser (1) and FIG. 2 is a lengthways cross-section through the dispenser (1), in its pre-actuated condition.
Figure 2:
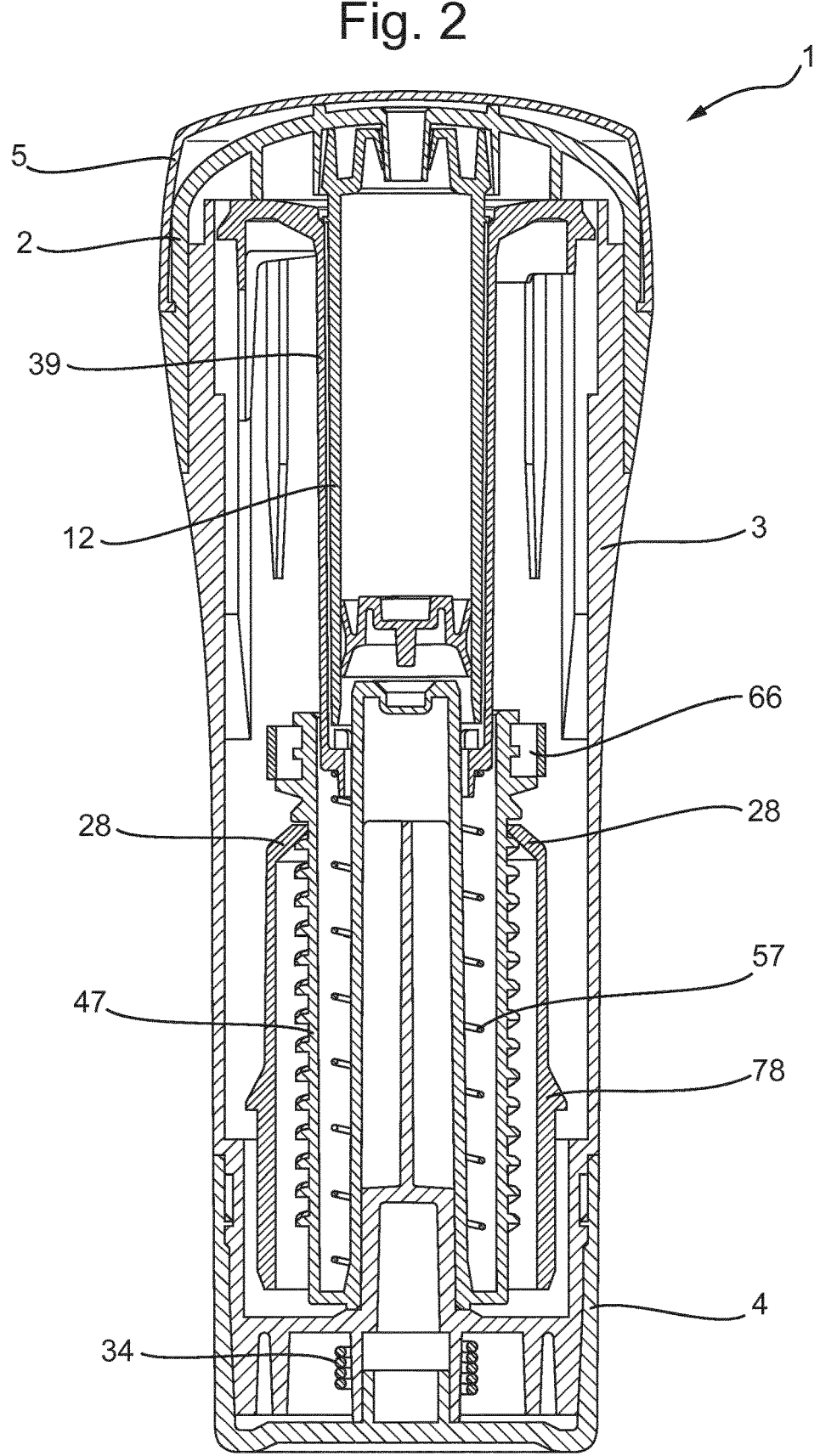

FIGS. 1 and 2 illustrate key components of the dispenser (1) and how they inter-relate. The dispenser (1) comprises an applicator head (2) attached to the upper end of a cylindrical body (3), which is in turn attached at its lower end to a dial unit (4). Within the cylindrical body (3), there are multiple components described further herein. On top of the applicator head (2) there is a removable over-cap (5), which can help reduce evaporative loss from a composition within a refill cartridge (12) used as part of the dispenser (1).

Figure 3:
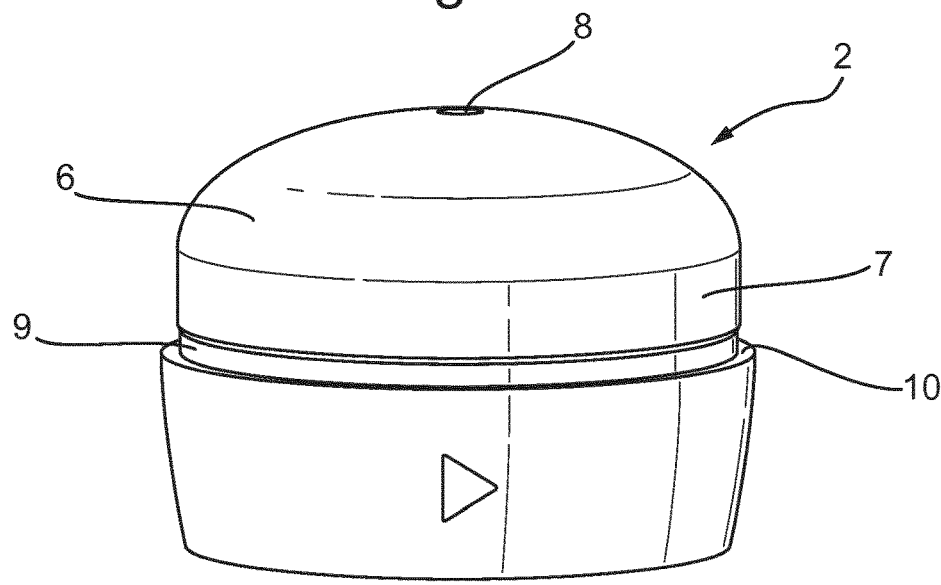
FIG. 3 is a view of the applicator head (2) of the dispenser (1) from the front.
Figure 4:
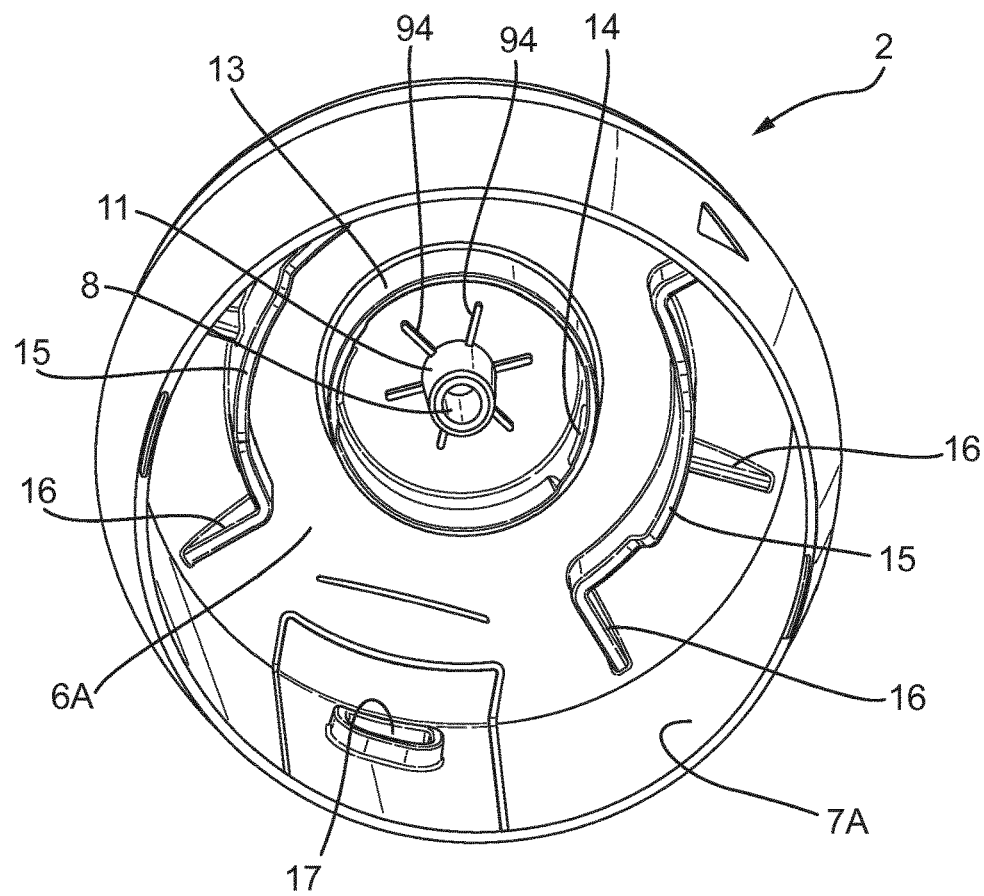
FIG. 4 is a somewhat skewed view of the applicator head (2) from below and FIG. 5 is a cross-section through the applicator head (2).
Figure 5:
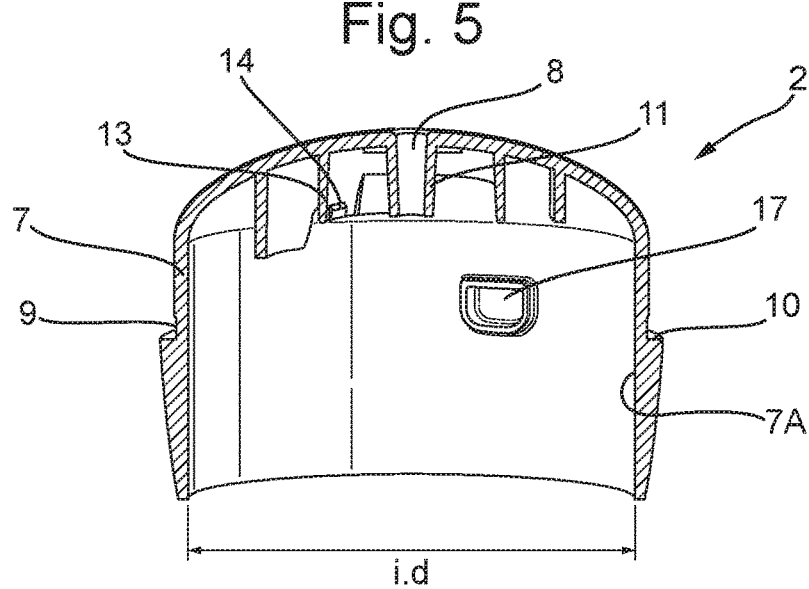

The applicator head (2) is further illustrated in FIGS. 3, 4 and 5. The applicator head (2) comprises a smooth convex upper outer surface (6) and a peripheral skirt (7) dependent therefrom. The upper surface (6) is pierced by a central aperture (8) through which the composition is propelled when the dispenser (1) is actuated.

The peripheral skirt (7) depends downwards with uniform external diameter for a distance, then, following an annular recess (9), there is an annular ledge (10) protruding radially outwards from the outer surface of the skirt (7). The width of the ledge (10) matches the thickness of the lower edge of the removable cap (5) designed to fit on top of the applicator head (2).

Moving downwards from the annular ledge (10), the external diameter of the peripheral skirt (7) narrows, until it is similar to that of the skirt (7) where it is above the annular recess (9). The internal diameter (i.d.) of the peripheral skirt (7) remains approximately constant for the full depth of the skirt (7), as illustrated in FIG. 5.

FIG. 4 illustrates that from around the central aperture (8), on the underside (6A) of the applicator head (2), there depends a cylindrical refill sealing projection (11). The refill sealing projection (11) serves to engage with a refill cartridge (12) for the dispenser (1) (vide infra).

From radially outside of the refill sealing projection (11), also on the underside (6A) of the applicator head (2), there depends a cylindrical refill retaining projection (13). From the inner surface of this projection (13), at its lower end, there protrude two diagonally opposed refill clips (14), which aid retention of the refill cartridge (12) in the refill retaining projection (13)(vide infra).

From radially outside of the refill retaining projection (13), also on the underside (6A) of the applicator head (2), there depend two diagonally opposed refill holder engagement tabs (15), together with various support walls (16). The refill holder engagement tabs (15) interact with the refill holder (39) and serve an important function when the refill cartridge (12) requires replacing (vide infra).

From the inner surface (7A) of the peripheral skirt (7), there protrude two diagonally opposed bayonet lugs (17) which serve to anchor the applicator head (2) to the cylindrical body (3), apart from when the refill unit (12) is being replaced (vide infra).

FIGS. 6, 7 and 8 illustrate features of the cylindrical body (3). These are described further in the following paragraphs.

At the upper end, on the outer surface of the cylindrical body (3), there is an applicator head sleeve (18), designed to hold the applicator head (2) via close contact with the internal surface (7A) of its peripheral skirt (7).

The applicator head sleeve (18) has a cut-away section (19) on its outer surface at its upper end. The cut-way section (19) continues into two diagonally opposed bayonet tracks (20) on the outer surface of the applicator head sleeve (18). These bayonet tracks (20) accept and hold the bayonet lugs (17) of the applicator head (2) when this is placed on top of the cylindrical body (3). The bayonet tracks (20) are designed to allow access of the bayonet lugs (17) when they are inserted from above, clockwise rotation of the applicator head (2) then locks the bayonet lugs (17) into the bayonet tracks (20) and prevents axial movement of the applicator head relative to the cylindrical body (3). When the applicator head (2) needs to be removed (typically when the refill unit requires replacing), the applicator head (2) is rotated counter-clockwise and the bayonet lugs (17) of the applicator head (3) may then be lifted clear of the bayonet tracks (20) of the cylindrical body (3).

To the centre of the front of the cylindrical body (3), and illustrated only in FIG. 1, there is affixed a control panel plate (21). The control panel plate (21) defines a dose window (21A), through which the reading on a dose counter (22) (vide infra) may be observed. The dose counter (22) sits within a dose counter cut-away (23) defined by the inner wall (3A) of the cylindrical body (3).

The dose counter (22) sits largely behind the aforementioned control panel plate (21), although it does protrude significantly below said plate (21), when the refill cartridge (12) of the dispenser (1) is full.

The dose counter cut-away (23) comprises gaps through the full depth of the cylindrical body (3) in a segment (23A) at the front of the cylindrical body (3) within the bounds of the control panel plate (21) and in segment (23B) below the control panel plate (21); the two segments (23A and 23B) are separated by a thickened section (3B) at the front of cylindrical body (3).

A further feature of the cylindrical body (3) protruding radially from its outer surface towards its bottom, is a dial sleeve rib (24), which is in large part responsible for axially anchoring the dial unit (4) to the base of the cylindrical body (3).

Towards the base of the cylindrical body (3), there are two diagonally opposed radial recesses (25) which function as rotation channels for engagement pockets (83) holding retention blades (27) of a ratchet sleeve (28) (vide infra). Each rotation channel (25) is bounded at its clockwise radial face by a "set stop face" (29) and at its counter-clockwise radial face by an "end-of-dose stop face" (30). These stop faces (29) and (30) interact with corresponding faces on the dial unit (4) to limit relative rotation thereof.

The back walls of the aforementioned "radial recesses" form part of a cylindrical wall (31) depending from the edge of a central inner horizontal platform (32) towards the base of the cylindrical body (3). A horizontal gap exists between the edge of the central inner horizontal platform (32) and the outer wall (3C) of the cylindrical body (3) where the rotational channels (25) are defined. This gap allows essential linkage between the dial unit (4) and the ratchet sleeve (28).

Within the cylindrical wall (31) and also depending from the inner platform (32), there is an inner cylindrical wall (33). The inner cylindrical wall (33) depends downwards slightly further than the "outer" cylindrical wall (31), i.e., it has slightly greater depth. This has implication with regard to the axially binding the dial unit (4) to the cylindrical body (3) (vide infra).

FIG. 8 illustrates that around the inner cylindrical wall (33) there is wound a dial spring (34). The dial spring (34) is a torsion spring and provides a clockwise rotational restoring force between the dial unit (4) and the cylindrical body (3). The lower end of the dial spring (34) is held by a dial spring retaining channel (35) in the dial unit (4), with which it may be rotated. The upper end of dial spring (34) is fixedly held) against a dial spring reaction face (36) on the bottom of the cylindrical body (3).

One section of the aforementioned (outer) cylindrical wall (31), where it is part of a rotation channel (25), defines a dial spring cut-away (37) for the dial spring (34). This part of the cylindrical wall (31) is of lesser depth, enabling the lower end of the dial spring (34) to pass below it and rotate in counter-clockwise direction as the dial unit (4) is so turned by rotational force, and then to rotate back to its starting position when the resulting rotational tensioning of the spring is released.

Features on the inner wall (3A) of the cylindrical body (3) are best illustrated in FIG. 7. Protruding from the top inner edge are four refill holder clips (38) which serve to retain a refill holder (39) for replaceable refill cartridges (12) used as part of the present embodiment. Also assisting in the retention of the refill holder (39) are four ledges (38A) that protrude outwards from the inner wall (3A) of the cylindrical body (3) a short distance below the refill holder clips (38).

The inner wall (3A) of the cylindrical body (3) defines restraining features for other components of the dispenser (1). Thus, there are two diagonally opposed recesses towards the top of said inner wall (3A) that function as rotation limit pockets (40) for the refill holder (39), i.e., they constrain the rotation of the refill holder (39) relative to the cylindrical body (3). These rotation limit pockets (40) are located above the dose counter cut-away (23) and a dose counter anti-rotation spline (41) diagonally opposed thereto.

The inner wall (3A) of the cylindrical body (3) defines two diagonally opposed recesses towards the top of said inner wall (3A) that function as "detent pockets" (42). These detent pockets (42) are located on a diagonal orthogonal to that bearing the rotation limit pockets (40). The detent pockets (42) serve to accommodate detent arms (43) protruding downwards from a collar (44) at the top of the refill holder (39). At their radial centres, each detent pocket (42) has a vertically orientated rib (42A) protruding slightly outwards (vide infra).

Towards its bottom, and running completely around the inner wall (3A) of the cylindrical body (3), there is a narrow, inwardly projecting radial shelf (45), which serves as an axial bearing for the ratchet sleeve (28).

Projecting upwards from the centre of the central inner horizontal platform (32) of the cylindrical body (3) there is a centralising boss (46) for a plunger (47) (vide infra). The centralising boss (46) is cylindrical at it base but has cross-shaped cross-section for most its length.

Within or partially within the cylindrical body (3) there are other key components of the dispenser (1) described further herein. Such key components include a refill holder (39), which holds the refill cartridge (12) for the dispenser (1); a "plunger" (47), which serves to force a fluid product from the refill cartridge (12) and a "ratchet sleeve" (28) which forces the plunger (47) upwards when the dial unit (4) is turned counter-clockwise with respect to the cylindrical body (3).

The refill holder (39) is illustrated in FIGS. 2, 9, 10 and 11. The refill holder (39) comprises a cylindrical body (49) and an annular collar (44) expanding horizontally from the upper edge thereof. The cylindrical body (49) of the refill holder (39) is hollow at its centre and the hollow is designed to accommodate the refill cartridge (12) for use with the dispenser (1).

The collar (44) expanding radially from the upper edge of the cylindrical body (49) of the refill holder (39) comprises a downward depending annular sleeve (50) at its outer circumference. The annular sleeve (50) has an outward sloping annular eave (51). This serves to axially retain the refill holder (39) within the cylindrical body (3) of the dispenser (1), the annular eave (51) fitting between the refill holder clips (38) and the ledges (38A) protruding from the inner wall (3A) of the cylindrical body (3).

Protruding downwards from the annular sleeve (50) are two diagonally opposed detent arms (43) which engage with the detent pockets (42) in the inner wall (3A) the cylindrical body (3). The detent arms (43) have an outwardly pointing truncated-V cross-section. The radially outer ends of the detent arms (43) and the vertically orientated ribs (42A) in the centre of the detent pockets (42) of the cylindrical body (3) provide resistance to the free rotation of the one relative to the other. When the refill holder (39) is rotated [by rotation of the applicator head (2)], the detent arms (43) are forced over the ribs (42A) protruding from the detent pockets (43) of the cylindrical body (3), providing a resistance to said rotation.

The top surface of the circular collar (44) defines two diagonally opposed engagement pockets (52) for holding engagement tabs (15) of the applicator head (2). The engagement pockets (52) are inset into the circular collar (44) at radial positions adjacent to where the detent arms (43) depend from the circular collar (44). The interaction of the engagement tabs (15) of the applicator head (2) with the engagement pockets (52) of the refill holder (39) provides a rotational lock between these components.

Running down the outer surface of the cylindrical body (49) of the refill holder (39) are two sets of diagonally opposed "plunger splines" (52A). These splines (52A) interact with recesses (53) in the plunger (47) described in detail below and rotationally lock the plunger (47) to the refill holder (39), without hindering the relative axial movement of the two which is essential to the functioning of the dispenser (1).

Projecting radially outwards from the annular sleeve (50) are two diagonally opposed bosses (53A). These bosses (53A) exist on a diagonal orthogonal to that bearing the detent arms (43) and the engagement pockets (52). The bosses (53A) limit the rotation of the refill holder (39) relative to the cylindrical body (3) by interaction with the rotation limiting pockets (40) thereof (vide supra).

The rotational limits of the bosses (53A) of the refill holder (39) within the rotation limiting pockets (40) of the cylindrical body (3) define the limits rotation of the detent arms (43) within the detent pockets (42) of the cylindrical body (3). Further, the rotational limits of these sets of features correspond to those of the rotation of the bayonet lugs (17) of the applicator head (2) within the bayonet tracks (20) incised into the outer surface of the cylindrical body (3).

FIG. 11 illustrates that close to the bottom of the cylindrical body (49) of the refill holder (39), there is an inwardly projecting radial shelf (54). Sat on top of this radial shelf (54) at regular angular intervals are six refill stop splines (55) which serve as axial bearings for the bottom of the refill cartridge (12).

Below the radial shelf (54), the outer surface of the cylindrical body (49) has a recessed section (56) of reduced inner and outer diameter. This section (56) of the cylindrical body (49) serves as a retaining boss for an optional compression spring (57) that acts between the refill holder (39) and the plunger (47) as a reset spring, biasing the plunger (47) downwards.

Within the cylindrical body (3) there is a plunger (47). This illustrated in FIGS. 2, 12 and 13.

FIG. 13 is a cross-section also illustrating the relative position of the reset spring (57).

The plunger (47) comprises an outer cylindrical shell (58) surrounding an inner cylindrical boss (59) which is hollow along its central axis. The cylindrical boss (59) is topped by a drive face (60) which protrudes somewhat above the surrounding outer cylindrical shell (58). The inner cylindrical boss (59) and outer cylindrical shell (58) share a common axis and are linked at their base by a reset stop face (61). The bottom of the inner cylindrical boss (59), within the reset stop face (61), is open, allowing access for the centralising boss (46) of the cylindrical body (3).

The outer cylindrical shell (58) comprises two types of teeth on its outer surface: advancing helix teeth (62) and non-return horizontal teeth (63).

There are two sets of non-return horizontal teeth (63) diagonally opposed on the outer surface of outer cylindrical shell (58) and each extends for an angular distance of about 40°.

The non-return teeth (63) are of triangular cross-section and each tooth is in a plane orthogonal to the central axis, i.e. in a horizontal plane, and each set comprises teeth stacked equidistantly one above another.

There are also two sets of advancing helix teeth (62) diagonally opposed on the outer surface of outer cylindrical shell (58). These teeth are of greater radial extent than the non-return teeth (63), each extending for an angular distance of about 80°.

The advancing helix teeth (62) are of triangular cross-section and slope helically downwards in a counter-clockwise direction around the outer surface. Each set of advancing helical teeth (62) comprises teeth stacked equidistantly one above another.

The non-return teeth (63) and the advancing helix teeth (62) are of (approximately) the same cross-sectional radial height and are of similar shape for much of the length of the advancing helix teeth (62), although the latter do slope into the surface from which they protrude at their clockwise end.

The non-return teeth (63) and the advancing helix teeth (62) are of (approximately) equal vertical spacing.

Each set of the advancing teeth (62) protrude from a section (58A) of the outer cylindrical shell (58) recessed relative to raised sections (58B) of the outer cylindrical shell (58), from which the non-return teeth (63) protrude.

The recessed sections (58A) are recessed such that the outer pinnacle of each of the advancing teeth (62) protrudes to a radial extent equal to or below the troughs between the non-return teeth (63).

Each advancing helix tooth (62) rises from its recessed section (58A) of the outer cylindrical shell (58) at its most clockwise point and slopes helically downward in a counter-clockwise direction. The downward slope is such that the pinnacle of an advancing tooth (62) drops a distance approximately equal to that between adjacent advancing helix teeth (62), which is in turn approximately equal to that between adjacent non-return teeth (63), between its most clockwise point and its most counter-clockwise-point.

From the clockwise edge of each set of advancing helix teeth (62), the recessed sections (58A) from which said teeth protrude extend smoothly for a further radial distance of about 45° clockwise to the next raised section from which non-return teeth (63) protrude. By "smoothly" it is to be understood that there are no teeth (62 or 63) in this region specified, although other annular raised features do cut across it at its upper end (vide infra).

The raised sections (58B) of the outer cylindrical shell (58) are radially extended relative to the recessed sections (58A), with which they share a common central axis for their radii of curvature.

The plunger (47) comprises, at close to its upper end, features to retain the dose counter (DC) (22) (vide infra). These features are a DC retaining shelf (64) and above that two DC retaining clips (65), both extending radially from the outer surface of its outer cylindrical shell. The former (64) is a full annular protrusion, whilst the latter (65) only protrude at diagonally opposed sections which radially overlap the segment (58B) of the outer cylindrical shell (58) bearing the non-return teeth (63).

The inner surface of the outer cylindrical shell (58) of the plunger (47) defines two diagonally opposed recesses (53) extending the full length thereof. These recesses (53) accommodate the plunger splines (52A) of the refill holder (39), rotationally locking these two components together.

The dose counter (22) is illustrated in FIG. 14. It comprises a retaining hoop (66) in the form of an annular ring and a "flag" (67) attached thereto by an outwardly projecting flag retaining projections (68). The flag (67) extends down a side of the cylindrical body (3) in linear fashion and is curved inwards in a horizontal plane along its length, sharing a common axis with the cylindrical body (3), to ease its fitting within said cylindrical body (3). The flag (67) has an angular extent of approximately 50°.

The retaining hoop (66) of the dose counter (22) is held between the DC retaining shelf (64) and the DC retaining clips (65) of the plunger (47). In this way, the dose counter (22) is forced upwards whenever the plunger (47) is forced upwards. Numbers (not illustrated) on the outer surface of the dose counter flag (67) may be used to indicate doses delivered or doses remaining. Such numbers may be seen through the dose window (21A) present in the control panel plate (21).

The retaining hoop (66) has a rear lug (69) diagonally opposite the flag retaining projections (68). The rear lug (69) comprises two radial projections that fit into the DC anti-rotation spline (41) cut into the inner wall (3A) of the cylindrical body (3) and extending for the upper half thereof. This maintains the flag (67) in correct rotational orientation with respect to the cylindrical body (3) at all times.

At right angles to the rear lug (69) and the flag retaining projections (68), the retaining hoop (66) has diagonally opposed plunger recess clips (70). These radially expanded sections of the retaining hoop (66) allow passage of the retaining hoop (66) over the DC retaining clips (65) when the dose counter (22) is being fitted to the plunger (47). [During assembly (vide infra) the dose counter (22) is rotated after the plunger recess clips (70) are pushed over the DC retaining clips (65) in order to fix it axially in place on the plunger (47)].

The ratchet sleeve (28) is illustrated in FIGS. 2 and 15. It is of overall tubular construction and fits around the plunger (47) largely within the cylindrical body (3).

At the base (or bottom) of the ratchet sleeve (28) there are two diagonally opposed retention blades (27) that protrude downwards from the base of the ratchet sleeve (28) and interact with engagement pockets (83) in the dial unit (4) (vide infra). This interaction rotationally locks the ratchet sleeve (28) to the dial unit (4).

The retention blades (27) of the ratchet sleeve (28) each have retaining clips (71) on their upper outer surfaces. When assembled, the retaining clips (71) engage under lower edges (25A) of the cylindrical body (3) created by the two diagonally opposed radial recesses which function as rotation channels (25) for the engagement pockets (83) of the dial unit (4) (see FIG. 6).

The retention blades (27) of the ratchet sleeve (28) each define a cut-away section (72) at their lower counter-clockwise corners. The vertical face of one of these serves as a stop face (72A) for the lower end of the dial spring (34), together with the dial spring retaining channel (35) of the dial unit (4) mentioned above.

The upper part of the ratchet sleeve (28) comprises two sets of ratchet blades (73 and 74), each set protruding upwards from approximately half way up the ratchet sleeve (28) and each blade being diagonally opposed to its counterpart. The first set of ratchet blades (73) bear advancing ratchets (75) sloping inwards at their upper ends. The advancing ratchets (75) interact with the advancing helix teeth (62) of the plunger (47) (vide supra) and serve to drive the plunger (74) upwards when the ratchet sleeve (28) turns counter-clockwise. The second set of ratchet blades (74) bear non-return ratchets (76) projecting radially inwards from their upper ends. The non-return ratchets (76) interact with the non-return teeth (63) of the plunger (47) and serve to prevent downward return of the plunger (47) when an advancement is completed and the dial spring (34) forces the dial unit (4) and associated ratchet sleeve (28) to rotate clockwise back to the "set" position (vide infra).

The advancing ratchets (75) extend inward the farther, in order to interact with the advancing teeth (62) on the plunger (47), which are recessed relative to the non-return teeth (63).

The advancing ratchets (75) slope (vertically) downwards in a counter-clockwise direction, their slope matching that of the advancing teeth (62) on the plunger (47).

The non-return ratchets (76) are horizontal, like the non-return teeth (63) on the plunger with which they interact.

At the top end of the blade bearing them, the advancing ratchets (75) extend for approximately 30° and are diagonally opposed.

At the top end of ratchet bearing them, the non-return ratchets (76) extend for approximately 60° and are diagonally opposed.

The top ends of the ratchet blades (73 and 74) define circumferential gaps (77) in the ratchet sleeve (28). Each ratchet blade bearing the advancing ratchets (75) is separated, at its top end, from its neighbouring ratchet blades bearing the non-return ratchets (76) by an angular gap of approximately 60° in a clockwise direction and by an angular gap of approximately 30° in a counter-clockwise direction.

The circumferential gaps in the ratchet sleeve (28), defined by the ratchet blades (73), extend downwards for approximately half the length (height) of the ratchet sleeve (28).

The ratchet blades (74) bearing the advancing ratchets (75) expand, in a non-symmetrical fashion, as they progress downwards, each covering an angular extent of approximately 60° at their base, where they join a shelf (78) that slopes outwards from a full cylindrical part (79) of the ratchet sleeve (28) below. The blades (73) expand downwards in linear fashion, with most of the expansion occurring on the clockwise edges. The outwardly sloping shelf (78) extends horizontally around the full base of said ratchet blades (73) and extends as far as the nearest edges of the neighbouring ratchet blades (73) bearing the non-return ratchets (76).

The ratchet blades (74) bearing the non-return ratchets (76) each expand, in a symmetrical linear fashion, as they progress downwards, each covering an angular extent of approximately 60° at their base, where they merge with the full cylindrical part of the ratchet sleeve (28).

The shelves (78) at the bases of the ratchet blades (73) bearing the advancing ratchets (75) slope radially outward and downward and create horizontal thrust bearing faces (80) beneath them where they overhang the full cylindrical part of the ratchet sleeve (28). These thrust bearing faces (80) sit on axial bearings (45) within the cylindrical body (3) (vide supra).

At the base of the cylindrical body (3) is the dial unit (4). This is illustrated in FIGS. 1, 2, and 16. This is a cup-shaped unit having a largely flat solid circular base (81) and an outer solid cylindrical wall (82) rising from the outer edge of said base (81). Internally, on the base (81) of the dial unit (4) there are two diagonally opposed engagement pockets (83), each comprising two short walls (84) projecting radially inward from the cylindrical wall (82) across the circular base (81) linked by a curved inner wall (85), also extending across the circular base (81), sharing the same plane of curvature as the outer cylindrical wall (82). The engagement pockets (83) are designed to accommodate the bottom parts of the retention blades (27) of the ratchet sleeve (28) and prevent any relative rotational movement thereof (vide supra).

The outer surfaces of the short walls (84) of the engagement pockets (83) serve as "stop faces", interacting with the "set stop face" (29) and "end of dose stop face" (30) of the cylindrical body to limit the rotation of the dial unit (4) relative to the cylindrical body (3).

One of the engagement pockets defines a retaining channel (35) for the lower end of the dial spring (34) in its curved inner wall (85). The retaining channel (35) is bevelled at its upper corners to aid insertion of the dial spring (34). The lower end of dial spring (34) is rotationally restricted by the retaining channel (35) and by the stop face (72A) of a retention blade (27) of the ratchet sleeve (28), within its engagement pocket (83) of the dial unit (4).

The circular base (81) of the dial unit (4) comprises a short cylindrical wall (86) rising near its centre. This short cylindrical wall (86) fits snugly inside the inner cylindrical wall (33) depending from the inner platform (32) of the cylindrical body (3). The inner surface of circular base (81) faces the end of the inner cylindrical wall (33) of the cylindrical body (3) and prevents upward movement of the dial unit (4) relative to the cylindrical body (3).

Towards to the top of the outer cylindrical wall (82) on its inner surface, there are two diagonally opposed cylindrical body retaining clips (87). These are located on a diagonal approximately orthogonal to that on which the engagement pockets (83) are located.

The retaining clips (87) of the dial unit (4) clip over the dial sleeve rib (24) of the cylindrical body (3) to hold the dial unit (4) axially onto the cylindrical body (3).

The dial unit (4) may be turned counter-clockwise, to dispense the composition contained within the refill cartridge (12). Turning the dial unit (4) causes the ratchet sleeve (28) to turn as the two are rotationally fixed by means of the retention blades (27) protruding downwards from the ratchet sleeve (28) which interact with the engagement pockets (83) in the dial unit (4). The dial unit (4) and the ratchet sleeve (28) may together be viewed as the drive assembly for the dispenser (1).

When the drive assembly is in its most clockwise position, the drive assembly is said to be in its "rest position". When the drive assembly (100) is in its most counter-clockwise position, the drive assembly is said to be in its "advance position". The drive assembly is sprung biased via the dial spring (34) towards its rest position. A user effort must be applied to rotate the drive assembly to its advance position.

In the rest position, the advancing ratchets (75) sit in slight axial clearance of the advancing teeth (62) of the plunger (47). As the drive assembly is rotated counter-clockwise (towards its advance position), each advancing ratchet (75) will engage with an advancing tooth (62) on the plunger (47). As rotation continues, the advancing tooth (75) engaged is forced upwards by the advancing ratchet (75), together with the plunger as a whole. This forces the plunger (47) to move upwards, together with its boss (59), the drive face (60) of which acts upon the moveable piston seal of the refill cartridge (12) and thereby forces this upwards as well. The composition in the refill cartridge (12) is thus forced through the aperture (8) in the applicator head (2) onto the applicator upper surface (6), from whence it is applied.

The non-return ratchets (76) of the ratchet sleeve (28) engage with the non-return teeth (63) on the plunger (47) to prevent downward travel of the plunger (47). As the drive assembly approaches the advance position, the non-return ratchets (76) deflect outwards and snap over the next non-return tooth (63) on the plunger (47).

When the advance position is reached, each advancing ratchet (75) has advanced the drive face (60) of the plunger (47) by an amount equating to a full dose of the composition contained within the refill cartridge (12). Further counter-clockwise rotation of the advancing ratchets (75) is prevented by the interaction between the "stop faces" (30 and 84, respectively) of the cylindrical body (3) and the dial unit (4).

When the drive assembly is rotated back to its rest position by the dial spring (34), the non-return teeth (63) of the plunger (47) relax back slightly onto the non-return ratchets (76) and each advancing ratchet (75) snaps over the next advancing tooth (62).

Doses can continue to be dispensed by the method described until the advancing ratchets (75) have no more advancing teeth (62) to advance. The dial unit (4) may still be rotated at such stage, but no further advancement of the plunger (47) will occur.

FIG. 17 illustrate aspects of the refill cartridge (12) used as a replaceable part of the present dispenser (1). The position of the refill cartridge (12) in relation to the other components of the dispenser (1) is illustrated in FIG. 2.

The refill cartridge (12) sits within the refill holder (39). It comprises a refill body (88) and a refill piston (89).

The refill body (88) comprises a cylindrical barrel (90) and an annular applicator head reaction face (91) protruding from a top face (92) of the refill body (88). The annular applicator head reaction face (91) defines at its centre an inwardly tapering tubular orifice (93). This tubular orifice (93) is designed to seal against the refill sealing projection (11) depending from the centre of the underside of the applicator head (2), when all relevant components are assembled.

When relevant components are assembled, the applicator head reaction face (91) of the refill cartridge (12) presses against ribs (94) protruding radially from the refill sealing projection (11) at the centre of the underside of the applicator head (2), these ribs (94) being illustrated in FIG. 4.

When relevant components are assembled, the refill clips (14) on the inner edge of the refill retaining projection (13) clip under a retaining lip (95) present on the outer surface of the cylindrical barrel (90) of the refill cartridge (12). This gives a light axial binding of the refill cartridge (12) to the applicator head (2) and enables the refill cartridge (12) to be later removed from the refill holder (39) without the consumer needing to touch the potentially exposed composition at the end of the refill cartridge (12) itself.

Towards the top of the cylindrical barrel (90) of the refill cartridge (12), but below the aforementioned retaining lip (95), there is an annular bead (96) projecting outwards from the barrel's surface. This serves to prevent the refill cartridge (12) being inserted the wrong way into the refill holder (39) by consumers.

The cross-sectional element of the refill piston (89) is hatched in FIG. 17. It is inserted into the refill body (88) after the two components have been independently manufactured.

When relevant components are assembled and the dispenser (1) is actuated, the refill piston (89) is forced upwards by the drive face (60) at the top of the cylindrical boss (59) of the plunger (47). This in turn forces the composition within the refill cartridge (12) out through the central aperture (8) in the applicator head (2) and onto the surface (6) thereof.

The refill cartridge (12) typically has a cap (97) (not illustrated) associated with it, said cap (97) being for sealing the refill cartridge (12) during transit prior to its loading into the dispenser (1).

When the refill cartridge (12) requires replacing, this is easily achieved. The user first rotates the applicator head (2) counter-clockwise by approximately 30°. This disengages the bayonet lugs (17) of the applicator head (2) from their bayonet tracks (20) on the outer surface of the applicator head sleeve (18) and allows the applicator head (2) and associated refill cartridge (12) to be lifted clear of the cylindrical body (3) and associated refill holder (39). The refill cartridge (12) is held on the applicator head (2) by the refill retaining projection (13) and its associated refill clips (14), but can be easily removed by hand.

When the applicator head (2) is rotated anticlockwise to disengage the bayonet lugs (17) from the bayonet tracks (20), there is a secondary effect upon the plunger (47). The applicator head (2) is rotationally locked to refill holder (39) by means of the engagement tabs (15) of the former interacting with the engagement pockets (52) of the latter. Further, the refill holder (39) is rotationally locked to the plunger (47) by means of the plunger splines (52A) of the former being inserted into longitudinal recesses (53) in the latter. Thus, turning the applicator head (2) turns the plunger (47).

When the plunger (47) is turned counter-clockwise by the refill holder (39) by approximately 30° from its rest position, the non-return ratchets (76) on the ratchet sleeve (28) become disengaged from the non-return teeth (63) on the plunger (47). At this rotational orientation, the advancing ratchets (75) and non-return ratchets (76) on the ratchet sleeve (28) are aligned with the recessed sections (58A) of the plunger (47), the former being aligned with those parts of the recessed sections (58A) that bears no teeth. This enables the plunger (47) to "re-set" by sliding vertically down with respect to the ratchet sleeve (28). This re-setting is assisted by the reset spring (57), the top end of which is coiled around the recessed outer section (56) at the base of refill holder (39). At its lower end the reset spring (57) presses downwards on top inner surface of the reset stop face (61) at the base of the plunger (47).

When the applicator head (2) is replaced and turned clockwise to lock and set the dispenser (1) ready for use, the ratchet sleeve (28) is re-positioned at the top of the plunger (47) ready for re-engagement therewith.

The over-cap (5) has inwardly projecting tongues (not illustrated) designed to protrude into the annular recess (8) in the peripheral skirt (7) of the applicator head (2) and thereby aid its retention thereon.

It should be understood that each feature of the assembly/manufacture as described in detail herein is independently a preferred aspect of the third aspect of the invention referred to above.

Dispensers in accordance with the specific embodiment may be assembled by a process involving the following stages.

In a first stage, a ratchet sleeve (28) is inserted through a cylindrical body (3) of the dispenser (1), from its top end down to its bottom. A torsion (dial) spring (34) is then placed on the bottom of the body (3), engaging with the ratchet sleeve (28), whilst it and the associated cylindrical body (3) are in an inverted position. A dial unit (4) is then affixed and the components so assembled are inverted to an upright orientation.

In a second independent stage, a dose counter (22) is fixed onto a plunger (47), this preferably involving a rotation of one of these components relative to the other to axially lock the two components together.

In a third stage, the pre-assembled plunger (47) plus dose counter (22) plus optional compression (reset) spring (57) is inserted from the top into the cylindrical body (3) plus assembled components as described above. This is done is such a way that the dose counter flag (67) is inserted along the DC cut away (23) in the cylindrical body (3) and the dose counter rear lug (69) is inserted along the DC anti-rotation spline (41) in the cylindrical body (3). The rotational orientation of the plunger (47) relative to the ratchet sleeve (28) is such that it may be inserted within the ratchet sleeve (28).

In a fourth stage, the refill holder (39) is inserted from the top of the dispenser (1) as thus far assembled. The detent arms (43) slide down the detent pockets (42) in the cylindrical body (3) and the rotation limiting bosses (53A) are lowered into the rotation limit pockets (40) of cylindrical body (3) and the splines (52a) slide down into slots (53) of the plunger (47). Towards the end of its insertion, the annular eave (51) on the outer periphery of the refill holder (39) pops under the refill holder clips (38) that project from the top inner surface of the cylindrical body (3) and then sits on top of the ledge (38A) protruding from the inner surface of the same.

Following this fourth stage, a refill cartridge (12) may be optionally placed within the refill holder (39).

In a final stage, the applicator head (2) is placed on top of the dispenser (1) as thus far assembled. This may only be done when the refill holder (39) is rotationally aligned with the cylindrical body (3) such that the engagement tabs (15) of the applicator head (2) may slide into the engagement pockets (52) of the refill holder (39) and the bayonet lugs (17) of the applicator head (2) may slide vertically down into the bayonet tracks (20) of the cylindrical body (3). The applicator head (2) is then turned clockwise to lock and set the dispenser (1) ready for use, assuming that a refill cartridge (12) has been added.

The invention claimed is:

1. A dispenser suitable for delivery of a cream, gel or soft solid composition comprising:
   (i) a convex applicator surface at an upper end;
   (ii) a replaceable cartridge containing a composition to be dispensed;
   (iii) a passageway between the cartridge and the applicator surface;
   (iv) a drive mechanism for forcing the composition from the cartridge through the passageway and onto the applicator surface;
   (v) an outer body containing features (ii) to (iv); and
   (vi) a non-return ratchet which interacts with a plunger to prevent significant axially movement of the plunger whilst a dial unit is rotated in a second direction;

the drive mechanism comprising the dial unit and the plunger, rotation of the dial unit in a first direction advancing the plunger axially upwards, the plunger acting upon a piston seal at the base of the replaceable cartridge, thereby forcing the contained composition upwards and outwards through the passageway and onto the applicator surface; rotation of the dial unit in the second direction, counter to the first, rotationally re-setting the dial unit relative to the plunger in readiness for a further advancement of the plunger, rotation in the second direction not causing significant axial movement of the plunger and being brought about by a torsion spring that forces the dial unit back to its position before the dial unit was turned when torque applied to turn the dial unit in its first direction is released, wherein an advancing ratchet which is rotationally locked to the dial unit interacts with advancing teeth on the plunger to cause the plunger to be raised axially upwards when the dial unit is rotated in its first direction and wherein the non-return ratchet is rotationally locked to the dial unit and interacts with a set of non-return teeth on the plunger to prevent axially downward movement of the plunger when the dial unit is rotated in its second direction and wherein the advancing ratchet and the non-return ratchet are part of a ratchet sleeve, which is moulded independently of the dial unit, but slotted in to the dial unit in a rotationally fixed manner during assembly of the dispenser.

2. A dispenser according to claim 1, wherein the plunger may be rotated, independent of the dial unit, to a rotational position in which the plunger is disengaged from the dial unit, allowing the plunger to drop back to its start position.

3. A dispenser according to claim 1, comprising a holding unit for the replaceable cartridge.

4. A dispenser according to claim 1, comprising stop faces that restrict rotational movement of the dial unit in its first direction to less than 180°.

5. A dispenser according to claim 1, wherein the advancing teeth on the plunger protrudes from its outer surface and slope helically downwards around the outer surface of the plunger in the first direction.

6. A dispenser according to claim 1, wherein the non-return teeth on the plunger protrudes from its outer surface and each tooth is in a horizontal plane, stacked one above another in the set.

7. A dispenser according to claim 1, wherein the non-return teeth on the plunger sit on a section of the plunger raised radially above a section bearing the advancing teeth.

8. A dispenser according to claim 7, wherein the plunger has two raised sections bearing non-return teeth diagonally opposed and separated by two lower sections bearing advancing teeth and wherein there are also two diagonally opposed non-return ratchets designed to interact with the non-return teeth and two advancing ratchets designed to interact with the advancing teeth.

9. A dispenser according to claim 1, wherein the passageway between the cartridge and the applicator surface has a minimum cross-sectional area of at least 1.0 mm$^2$.

10. A dispenser according to claim 1, wherein the replaceable cartridge may be removed from the cylindrical body or a refill holder within the cylindrical body by means of a removable applicator head bearing the convex applicator surface at the top of the replaceable cartridge.

11. A method of manufacture of dispensers according to claim 1 comprising the bringing together of:
   (i) the convex applicator surface, to be located at the upper end;
   (ii) the replaceable cartridge having the piston seal at its base and containing the composition to be dispensed;
   (iii) the passageway between the cartridge and the applicator surface;
   (iv) the drive mechanism for forcing the composition from the cartridge through the passageway and onto the applicator surface, the drive mechanism comprising the dial unit and the plunger; and
   (v) the outer body for containment of features (ii) to (iv) wherein:
      a) the ratchet sleeve responsible for axial movement of the plunger is inserted into the cylindrical container and the dial unit is affixed to the base of the cylindrical body and of to the base of the ratchet sleeve, such that the dial unit is rotational fixed to the ratchet sleeve;
      b) the plunger is inserted into the assembly formed in step a);
      c) a holder for the replaceable cartridge in inserted into the assembly formed in step b);
      d) an applicator head comprising the applicator surface is locked onto the assembly formed in step (c), optionally after the replaceable cartridge is inserted into the holder therefor.

* * * * *